(12) United States Patent  
Hallett et al.

(10) Patent No.: US 8,343,241 B2
(45) Date of Patent: Jan. 1, 2013

(54) PROCESS FOR THE CONVERSION OF ORGANIC MATERIAL TO METHANE RICH FUEL GAS

(75) Inventors: Douglas John Hallett, Kingston (CA); Craig Steven McEwen, Waterloo (CA)

(73) Assignee: Natural Energy Systems Inc., Mississauga, Ontario (CA)

( * ) Notice: Subject to any disclaimer, the term of this patent is extended or adjusted under 35 U.S.C. 154(b) by 385 days.

(21) Appl. No.: 12/703,826

(22) Filed: Feb. 11, 2010

(65) Prior Publication Data

US 2010/0199559 A1      Aug. 12, 2010

Related U.S. Application Data

(60) Provisional application No. 61/151,588, filed on Feb. 11, 2009.

(51) Int. Cl.
  *C01B 3/32* (2006.01)
  *C01B 3/36* (2006.01)
  *C01B 6/24* (2006.01)

(52) U.S. Cl. .................. 48/127.3; 48/197 R; 48/127.5; 423/644

(58) Field of Classification Search ................. 48/197 R
See application file for complete search history.

(56) References Cited

U.S. PATENT DOCUMENTS

| | | | |
|---|---|---|---|
| 3,720,729 A * | 3/1973 | Sze et al. ................. | 208/57 |
| 4,144,152 A | 3/1979 | Kitchens | |
| 4,216,077 A * | 8/1980 | Chahvekilian et al. ......... | 208/57 |
| 4,284,531 A | 8/1981 | Simpson et al. | |
| 4,589,973 A * | 5/1986 | Minden ................. | 208/410 |
| 5,050,511 A | 9/1991 | Hallett et al. | |
| 5,100,638 A | 3/1992 | Levin | |
| 5,103,578 A | 4/1992 | Rickard | |
| 5,118,429 A | 6/1992 | Anderson et al. | |
| 5,177,268 A | 1/1993 | Balko et al. | |
| 5,186,824 A | 2/1993 | Anderson et al. | |
| 5,191,155 A | 3/1993 | Driemel et al. | |
| 5,197,823 A | 3/1993 | Cutshall et al. | |
| 5,245,113 A | 9/1993 | Schulz | |
| 5,290,432 A | 3/1994 | Friedman et al. | |
| 5,369,214 A | 11/1994 | Farcasiu et al. | |
| 5,382,736 A | 1/1995 | Baghel et al. | |
| 5,602,298 A | 2/1997 | Levin | |
| 5,650,549 A | 7/1997 | Dellinger et al. | |
| 5,695,732 A | 12/1997 | Sparks et al. | |
| 5,698,829 A | 12/1997 | Ruddick et al. | |
| 5,789,649 A | 8/1998 | Batchelor et al. | |
| 5,932,472 A | 8/1999 | Abdullah et al. | |
| 5,936,137 A | 8/1999 | Zachriah et al. | |
| 5,994,604 A | 11/1999 | Reagen et al. | |
| 6,112,675 A | 9/2000 | Potter et al. | |

(Continued)

FOREIGN PATENT DOCUMENTS

GB      1370362      10/1974

(Continued)

*Primary Examiner* — Matthew Merkling
(74) *Attorney, Agent, or Firm* — Bereskin & Parr LLP/S.E.N.C.R.L., s.r.l.; Michael Fenwick

(57) ABSTRACT

The present disclosure relates to a process for the conversion of organic material to methane rich gas. In particular, the process comprises heating vaporized organic material in the presence of an excess amount of hydrogen gas and superheated steam to produce a methane rich fuel gas at pressures greater than 0 atmospheres gauge up to about 2 atmosphere gauge.

44 Claims, 11 Drawing Sheets

U.S. PATENT DOCUMENTS

| | | | |
|---|---|---|---|
| 6,117,335 A | 9/2000 | Bender | |
| 6,210,561 B1 | 4/2001 | Bradow et al. | |
| 6,213,029 B1 | 4/2001 | Potter et al. | |
| 6,241,856 B1 | 6/2001 | Newman et al. | |
| 6,319,328 B1 | 11/2001 | Greenberg et al. | |
| 6,380,454 B1 | 4/2002 | Gonzalez et al. | |
| 6,414,212 B1 | 7/2002 | Gonzalez et al. | |
| 6,599,423 B2 | 7/2003 | Boles et al. | |
| 6,649,044 B1 | 11/2003 | Bolsing et al. | |
| 6,767,163 B2 | 7/2004 | Almeida et al. | |
| 6,984,768 B2 | 1/2006 | Ginosar et al. | |
| H2198 H | 8/2007 | Quimby | |
| 7,752,983 B2 * | 7/2010 | Vera | 110/250 |
| 2006/0265953 A1 * | 11/2006 | Hobbs | 48/127.3 |
| 2011/0049016 A1 * | 3/2011 | McGrady et al. | 208/390 |

FOREIGN PATENT DOCUMENTS

| | | |
|---|---|---|
| WO | 2004/072547 | 8/2004 |
| WO | 2006/076801 | 7/2006 |
| WO | 2006/081661 | 8/2006 |
| WO | 2006/128285 | 12/2006 |
| WO | 2006/128286 | 12/2006 |
| WO | 2007/131234 | 11/2007 |
| WO | 2007/131235 | 11/2007 |
| WO | 2007/131236 | 11/2007 |
| WO | 2007/131239 | 11/2007 |
| WO | 2007/131240 | 11/2007 |
| WO | 2007/131241 | 11/2007 |
| WO | 2007/143376 | 12/2007 |
| WO | 2007/143673 | 12/2007 |
| WO | 2008/011213 | 1/2008 |
| WO | 2008/104058 | 9/2008 |
| WO | 2008/104088 | 9/2008 |
| WO | 2008/117119 | 10/2008 |
| WO | 2008/138117 | 11/2008 |
| WO | 2008/138118 | 11/2008 |

* cited by examiner

PROCESS FOR THE CONVERSION OF ORGANIC MATERIAL TO METHANE RICH FUEL GAS

This application claims the benefit of 35 U.S.C §119 based on the priority of U.S. Provisional Application No. 61/151,588, filed Feb. 11, 2009, the contents of which are herein incorporated herein, in their entirety, by reference.

FIELD OF THE DISCLOSURE

The present disclosure relates to the conversion of organic material to a methane rich clean burning fuel gas. In particular, the disclosure relates to a process for the treatment of organic material comprising vaporizing the organic material in the presence of an excess amount of hydrogen gas and superheated steam.

BACKGROUND OF THE DISCLOSURE

The world's power demands are expected to rise 60% by 2030 (World Energy Outlook, Paris IEA, 2004-10-26 pp. 31). The International Energy Agency (IEA) estimates that fossil fuels will account for 85% of the energy market by 2030. In fossil fuel power plants the chemical energy stored in fossil fuels (for example, coal, fuel oil, natural gas and oil shale) and oxygen from air is converted successively into thermal energy, mechanical energy and, finally, electrical energy for continuous use and distribution. Most thermal power generating stations in the world use fossil fuel, outnumbering nuclear, geothermal, biomass and solar thermal plants.

Natural gas, which is predominantly methane, is widely used in many industries both as a feedstock for chemical synthesis and as a major source of electricity generation through the use of gas and steam turbines. Natural gas burns cleaner than other fossil fuels, such as oil and coal, and produces less greenhouse gas per unit energy released. Power generation using natural gas is thus the cleanest fossil fuel source of energy available and this technology is used wherever competitive. Compressed natural gas is also used as a clean alternative for automobile fuels.

Natural gas can be used to produce hydrogen through carbon dioxide reforming and water gas shift reactions. Hydrogen has various applications, for example, it is a primary feed stock for the chemical industry, a hydrogenating agent and a fuel source in hydrogen based-fuel cells, for example in hydrogen vehicles.

The increasing price of natural gas, along with diminishing domestic supply, creates incentive for other sources of this fuel. Gasification of fossil fuels, for example coal, is one option, however, most commercially ready coal gasifiers are predominantly designed to produce syngas that is high in carbon monoxide and hydrogen while minimizing the methane content.

Existing methods of destroying organic waste material are usually accomplished using high temperature incineration. These incinerators are very capital intensive, and therefore require large installations, which increase public concern. They are also expensive to operate and have exhibited a history of blow-backs or explosions caused during loading of the hazardous materials.

The following are a group of patents related to commercial attempts at gasification and steam reforming:

TSANGARIS, Andreas, and Marc BACON, PCT patent application no. WO 2008/138118;
TSANGARIS, Andreas, and Marc BACON, PCT patent application no. WO 2008/138117;
TSANGARIS, Andreas, and Margaret SWAIN, PCT patent application no. WO/2008/117119;
TSANGARIS, Andreas, and Marc BACON, PCT patent application no. WO 2008/104088;
TSANGARIS, Andreas, and Marc BACON, PCT patent application no. WO 2008/104058;
TSANGARIS, Andreas, Margaret SWAIN, Kenneth Craig CAMPBELL, Douglas Michael FEASBY, Thomas Edward WAGLER, Scott Douglas BASHAM, Mao Pei CUI, Zhiyuan SHEN, Ashish CHOTALIYA, Nipun SONI, Alisdair Alan MCLEAN, Geoffrey DOBBS, Pascale Bonnie MARCEAU, and Xiaoping ZOU. PCT patent application no. WO/2008/011213;
TSANGARIS, Andreas, and Margaret SWAIN, PCT patent application no. WO 2007/143673;
TSANGARIS, Andreas, Margaret SWAIN, Kenneth Craig CAMPBELL, Douglas Michael FEASBY, Thomas Edward WAGLER, Scott, Douglas BASHAM, Zhiyuan SHEN, Geoffrey DOBBS, Mao Pei CUI, and Alisdair Alan MCLEAN, PCT patent application no. WO/2007/131241;
TSANGARIS, Andreas, Margaret SWAIN, Douglas Michael FEASBY, Scott Douglas BASHAM, Ashish CHOTALIYA, and Pascale Bonnie MARCEAU, PCT patent application no. WO 2007/131240;
TSANGARIS, Andreas, Margaret SWAIN, Kenneth Craig CAMPBELL, Douglas Michael FEASBY, Thomas Edward WAGLER, Xiaoping ZOU, Alisdair Alan MCLEAN, and Pascale Bonnie MARCEAU, PCT patent application no. WO 2007/131239;
TSANGARIS, Andreas, Margaret SWAIN, Douglas Michael FEASBY, Scott Douglas BASHAM, Nipun SONI, and Pascale Bonnie MARCEAU, PCT patent application no. WO 2007/131236;
TSANGARIS, Andreas, Margaret SWAIN, Kenneth Craig CAMPBELL, Douglas Michael FEASBY, Scott Douglas BASHAM, Alisdair Alan McLEAN, and Pascale Bonnie MARCEAU, PCT patent application no. WO 2007/131235;
TSANGARIS, Andreas and Margaret SWAIN. PCT patent application no. WO 2007/131234;
TSANGARIS, Andreas, Kenneth C. CAMPBELL, and Michael D. FEASBY and Ke LI, PCT patent application no. WO 2006/128286;
TSANGARIS, Andreas, Kenneth C. CAMPBELL, Michael D. FEASBY, and Ke LI, PCT patent application no. WO 2006/128285;
TSANGARIS, Andreas V., and Kenneth C. CAMPBELL; PCT patent application no. WO 2006/081661;
TSANGARIS, Andreas V., George W. CARTER, Jesse Z., SHEN, Michael D. FEASBY, and Kenneth C. CAMPBELL, PCT patent application no. WO 2004/072547;
ZWIERSCHKE, Jayson, and Ernest George DUECK, PCT patent application no. WO/2006/076801;
SHETH, Atul C. PCT patent application no. WO/2007/143376.

The following are other patents related to hazardous waste destruction:
Abdullah, Shahid. Method for Degradation of Polychlorinated Biphenyls in Soil. U.S. Pat. No. 5,932,472;
Almeida, Fernando Carvalho. U.S. Pat. No. 6,767,163;
Anderson, Perry D., Bhuvan C. Pant, Zhendi Wang, et al. U.S. Pat. No. 5,118,429;
Baghel, Sunita S., and Deborah A. Haitko. U.S. Pat. No. 5,382,736;
Balko, Edward N., Jeffrey B. Hoke, and Gary A. Gramiccioni. U.S. Pat. No. 5,177,268;

Batchelor, Bill, Alison Marie Hapka, Godwin Joseph Igwe, et al. U.S. Pat. No. 5,789,649;
Bender, Jim. U.S. Pat. No. 6,117,335;
Boles, Jeffrey L., Johnny R. Gamble, and Laura Lackey. U.S. Pat. No. 6,599,423.
Bolsing, Friedrich, and Achim Habekost. Process for the Reductive Dehalogenation of Halogenated Hydrocarbons. U.S. Pat. No. 6,649,044;
Cutshall, Eule R., Gregory Felling, Sheila D. Scott, et al. U.S. Pat. No. 5,197,823;
Dellinger, Harold Barrett, and John L. Graham. U.S. Pat. No. 5,650,549;
Driemel, Klaus, Joachim Wolf, and Wolfgang Schwarz. Process for Nonpolluting Destruction of Polychlorinated Waste Materials. U.S. Pat. No. 5,191,155;
Farcasiu, Malvina, and Steven C. Petrosius. U.S. Pat. No. 5,369,214;
Friedman, Arthur J., and Yuval Halpern. U.S. Pat. No. 5,290,432;
Ginosar, Daniel M., Robert V. Fox, and Stuart K. Janikowski. U.S. Pat. No. 6,984,768;
Gonzalez, Luciano A., Henry E. Kowalyk, and Blair F. Sim. U.S. Pat. No. 6,414,212;
Gonzalez, Luciano A., Dennis F. Mullins, W. John Janis, et al. U.S. Pat. No. 6,380,454;
Greenberg, Richard S., and Thomas Andrews. U.S. Pat. No. 6,319,328;
Levin, George B. U.S. Pat. No. 5,602,298;
U.S. Pat. No. 5,100,638;
Newman, Gerard K., Jeffrey H. Harwell, and Lance Lobban. U.S. Pat. No. 6,241,856;
Potter, Raleigh Wayne, and Michael Fitzgerald. U.S. Pat. No. 6,213,029;
U.S. Pat. No. 6,112,675;
Quimby, Jay M. U.S. Statutory Invention Registration H2198H;
Reagen, William Kevin, and Stuart Kevin Janikowski. U.S. Pat. No. 5,994,604;
Rickard, Robert S. U.S. Pat. No. 5,103,578;
Ruddick, John N. R., and Futong Cui. U.S. Pat. No. 5,698,829;
Schulz, Helmut W. U.S. Pat. No. 5,245,113;
Sparks, Kevin A., and James E. Johnston. U.S. Pat. No. 5,695,732; and
Zachariah, Michael R., and Douglas P. DuFaux. U.S. Pat. No. 593,613.

U.S. Pat. No. 5,050,511 to Hallett describes the treatment of organic material by use of a process which combines a gas phase chemical reduction in a reducing atmosphere at a high temperature above about 600° C., preferably above 875° C., and thereafter, subjecting said material to chemical oxidation with a gaseous oxidizing agent at a temperature above about 1000° C. However, this process results in the production of a tarry material, which can result in the process being halted to remove the tarry material.

SUMMARY OF THE DISCLOSURE

It has now been found that heating vaporized organic material in the presence of an excess amount of hydrogen gas and, optionally, superheated steam to dehalogenate and/or desulfurize the organic material, followed by further heating the mixture in the presence of an excess amount of hydrogen gas and superheated steam to reduce organic compounds, results in the conversion of the organic material to a methane rich gas and a reduction in the amount of tarry material that is produced.

Accordingly, the present disclosure includes a process for the conversion of organic material to a methane rich gas comprising:
a) vaporizing the organic material in an enclosed chamber substantially free of oxygen and mixing the vaporized organic material with an excess amount of hydrogen gas and, optionally, superheated steam, at a temperature of about 450° C. to about 650° C. to form a first mixture;
b) heating the first mixture to a temperature of about 600° C. to about 900° C. in the presence of an excess amount of hydrogen gas and superheated steam to form a gaseous mixture comprising methane, hydrogen and acid; and
c) neutralizing the gaseous mixture with a base.

In another embodiment of the disclosure, the first mixture is sufficiently mixed to reduce the formation of tarry material.

In an embodiment of the disclosure, the vaporized organic material in a) is mixed with the excess hydrogen gas and, optionally, superheated steam at a temperature of about 475° C. to about 600° C.

In a further embodiment, the first mixture is heated in b) to a temperature of about 700° C. to about 900° C. In another embodiment, the first mixture is heated in b) to a temperature of about 800° C. to about 875° C.

In another embodiment of the disclosure, hydrogen is generated in b) through steam-methane reforming and the water-gas shift reactions. Hydrogen generated in this way reduces the overall requirement of hydrogen that must be added to form the first mixture.

In another embodiment of the disclosure, the process for the conversion of organic material to methane is conducted in the presence of a catalyst. In a further embodiment, the catalyst is a metal catalyst wherein the metal is selected from one or more of nickel, copper, iron, nickel alloys, tin, powdered tin, chromium and noble metals. In another embodiment, the noble metals are selected from platinum, silver, palladium, gold, ruthenium, rhodium, osmium and iridium.

In another embodiment of the disclosure, the gaseous mixture is neutralized in c) at a temperature of about 70° C. to about 100° C. In a further embodiment, the gaseous mixture is neutralized in c) at a temperature of about 85° C.

In an embodiment, the base comprises an alkali metal hydroxide or an alkali metal carbonate. In a further embodiment, the alkali metal hydroxide is sodium hydroxide. In another embodiment, the alkali metal carbonate is calcium carbonate.

In another embodiment of the disclosure, the process further comprises exposing the gaseous mixture from b) to UV light in the presence of excess hydrogen under conditions effective to reduce residual organic compounds in the gaseous mixture. In another embodiment, the conditions effective to reduce residual organic compounds in the gaseous mixture comprise heating to a temperature of about 600° C. to about 800° C. In a further embodiment, the conditions effective to reduce residual organic compounds in the gaseous mixture comprise heating to a temperature of about 650° C. to about 750° C. In another embodiment, the conditions effective to reduce residual organic compounds in the gaseous mixture comprise UV light at a wavelength of about 200 nm to about 300 nm. In another embodiment, the conditions effective to reduce residual organic compounds in the gaseous mixture comprise UV light at a wavelength of about 220 nm to about 254 nm.

In a further embodiment of the disclosure, the heating of the first mixture in b) is carried out in a second enclosed chamber substantially free of oxygen.

In another embodiment of the disclosure, the process further comprises cooling the neutralized gaseous mixture of c). In another embodiment, the gaseous mixture is cooled to a temperature of about 5° C. to about 35° C.

In another embodiment of the disclosure, the process further comprises exposing the neutralized and cooled gaseous mixture in the presence of excess hydrogen, to conditions effective to reduce residual organic compounds. In another embodiment, the conditions to reduce residual organic compounds in the neutralized and cooled gaseous mixture comprise UV light at a wavelength of about 200 nm to about 300 nm. In a further embodiment, the conditions to reduce residual organic compounds in the neutralized and cooled gaseous mixture comprise UV light at a wavelength of about 220 nm to about 254 nm. In another embodiment, the conditions to reduce residual organic compounds in the neutralized and cooled gaseous mixture further comprise heating to a temperature of about 300° C. to about 500° C. In an embodiment, the conditions to reduce residual organic compounds in the neutralized and cooled gaseous mixture further comprise heating to a temperature of about 400° C.

In another embodiment of the disclosure, the process further comprises separating the excess hydrogen from the methane after neutralizing the gaseous mixture in c). In an embodiment, the hydrogen is recycled for use in a).

In another embodiment, the methane comprises about 10% to about 20% by volume of hydrogen.

In another embodiment, a), b) and c) of the process of the disclosure are performed at a pressure greater than 0 atmosphere gauge to about 2 atmosphere gauge, suitably greater than 0 atmosphere gauge to about 0.5 atmosphere gauge.

In another embodiment of the disclosure, the organic material also comprises inorganic material which does not vaporize and is removed from the enclosed chamber.

In another embodiment of the disclosure, the organic material comprises organic waste material. In a further embodiment, the organic waste material comprises chlorinated or organophosphate chemical warfare agents; biological warfare agents; sewage; municipal and industrial solid waste or garbage; agricultural waste material; organic solvents; halogenated organic solvents; halogenated organic compounds, such as polychlorinated biphenyls, hexachlorobenzene, chlorinated pesticides, brominated fire retardants, fluorinated propellants or fluorinated refrigerants; organophosphate compounds such as pesticides; explosives such as trinitrotoluenes; rocket fuel; tires; plastics such as polyethylene; hydrazines; refinery and chemical manufacturing/processing wastes, for example still bottoms; coal; or oil and/or bitumen processing waste, for example from tar sands. In another embodiment, the chlorinated or organophosphate chemical warfare agent comprises mustard gas or VX nerve agent. In an embodiment, the biological warfare agent comprises anthrax. In a further embodiment, the agricultural waste material comprises poultry, cattle, swine or other livestock waste material. In another embodiment, the organic material comprises biomass, such as wood waste or pulp waste. In another embodiment, the biomass comprises wood chips. In another embodiment of the disclosure, the organic material comprises fossil fuels such as all types of coals, oil, or peat.

In a further embodiment of the disclosure the methane gas generated in the process is converted into electric power using conventional energy-making systems. Therefore these gases are fed into, for example, gas turbines, steam turbines or fuel cells. In an embodiment, the energy-making system is in close proximity to, or is in combination with, the apparatus for performing the process of the disclosure.

In another embodiment of the disclosure the methane gas generated in the process is used for chemical syntheses.

Additionally, the present disclosure includes a reaction, mixing or milling apparatus. The apparatus can be used as a continuous reduction vaporizer (CRV). In an embodiment of the disclosure, the apparatus comprises a vessel rotatable about an axis, the vessel including a first end having a coaxial inlet or outlet for respectively introducing or discharging materials from the vessel, the first end including a flange section having a generally radially extending first face. The apparatus further comprises a closure member arranged adjacent to the first end, the closure member including a generally radially extending second face in generally opposed relation to the first face. The apparatus yet further comprises inner and outer sealing elements arranged between the first and second faces, the inner and outer sealing elements defining a generally annular space, the annular space enclosing a sealing fluid therein for forming a seal between the vessel and the closure member.

Other features and advantages of the present disclosure will become apparent from the following detailed description. It should be understood, however, that the detailed description and the specific examples while indicating preferred embodiments of the disclosure are given by way of illustration only, since various changes and modifications within the spirit and scope of the disclosure will become apparent to those skilled in the art from this detailed description.

BRIEF DESCRIPTION OF THE DRAWINGS

Embodiments of the disclosure will be described in relation to the drawings in which.

Figure 1:
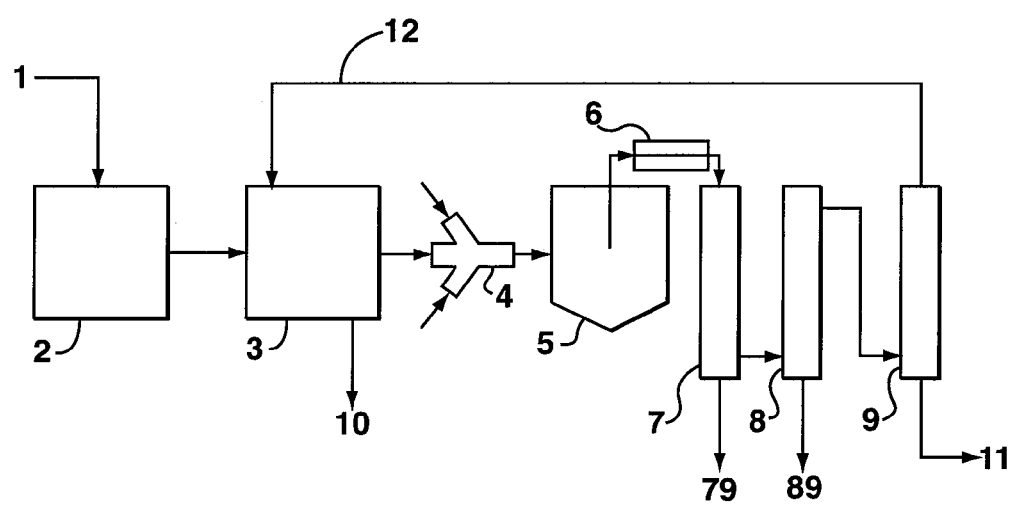
FIG. 1 is a schematic diagram of an embodiment of the process of the present disclosure.

DETAILED DESCRIPTION OF THE DISCLOSURE (I) Definitions

Unless otherwise indicated, the definitions and embodiments described in this and other sections are intended to be applicable to all embodiments and aspects of the disclosure herein described for which they are suitable as would be understood by a person skilled in the art.

The term "organic material" as used herein refers to any organic compound(s), biomass, microorganism(s), toxic mixtures or otherwise any carbon-based compound or mixture which can be converted to methane gas. The term "organic waste material" refers to material which requires treatment before disposal. The treatment of the organic waste material may be required because the material is toxic, infectious, environmental pollutant, etc. Examples of organic waste material include, but are not limited to, chlorinated or organophosphate chemical warfare agents, such as mustard gas or VX; biological warfare agents such as anthrax; sewage, municipal or industrial solid waste or garbage; agricultural waste material such as from poultry, cattle, swine or other livestock; organic solvents; halogenated organic solvents; halogenated organic compounds such as polychlorinated biphenyls, hexachlorobenzene, chlorinated pesticides, brominated fire retardants, fluorinated propellants or fluorinated refrigerants; organophosphate compounds such as pesticides; explosives such as trinitrotoluenes; rocket fuel; hydrazines; tires; plastics such as polyethylene; refinery and chemical manufacturing/processing wastes such as still bottoms; coal; or oil and/or bitumen processing waste, for example from tar sands. Organic material which can be converted to methane gas comprises any type of fossil fuel, for example coal or peat, or any type of renewable fuel biomass, for example, wood chips, which because it is carbon-based, is able to be converted to methane gas. Further, the biomass comprises waste biomass, such as wood waste or pulp waste.

The term "coal" as used herein includes all forms of readily combustible black or brownish sedimentary rock, such as lignite (or brown coal), sub-bituminous coal, bituminous coal, steam coal, anthracite and graphite.

The term "substantially free of oxygen" as used herein refers to the process of dehalogenating, desulfurizing and reducing organic compounds in the absence of oxygen. The objective of conducting the reactions in the absence of oxygen is to avoid the organic compounds from being oxidized which can result in unwanted side products. Accordingly, the oxygen content in the enclosed chamber is less than about 0.10%, optionally less about 0.08%, suitably less than about 0.04% by volume.

The term "excess amount" as used herein refers to an amount of hydrogen gas that is mixed with the organic material that exceeds the amount required for stoichiometry. The excess amount of hydrogen remaining after completion of the reduction reactions is (in mol %) about 10% to about 80%, suitably about 20% to about 60%, more suitably about 25% to about 50%.

The term "mixing" and "sufficiently mixed" as used herein refers to the homogenous mixing of the vaporized organic material with an excess of hydrogen and superheated steam so that the organic material is completely dehalogenated and reduced by the hydrogen gas. Thorough mixing allows the hydrogen gas to bombard the organic compounds in the organic material from all directions and helps the dehalogenation, desulfurization and reduction reactions to near completion. If the vaporized organic material is not sufficiently mixed with the excess amount of hydrogen gas and superheated steam, the compounds in the organic material will not be completely dehalogenated and reduced, resulting in the formation and condensation of a tarry material. Mixing is accomplished using any known means, for example, a static mixer or ensuring conditions that produce turbulent flow.

The term "tarry material" as used herein refers to condensed polyaromatic hydrocarbons which results from insufficient mixing of the organic material with an excess amount of hydrogen gas and superheated steam. When the organic material is not sufficiently mixed with an excess amount of hydrogen gas and superheated steam, the organic compounds in the organic material are incompletely dehalogenated and/or desulfurized and are subsequently incompletely reduced. As a result, aromatic compounds in the organic material condense and form tarry material which accumulates in the process reactor causing the process to be shut down. Furthermore, the tarry material must then be disposed.

The term "dehalogenate" as used herein refers to a process wherein organic compounds containing halogen atoms, such as iodine, fluorine, chlorine or bromine, react with hydrogen, resulting in loss of the halogen atom from the organic compound and replacement with a hydrogen atom. The reaction also generates acid.

The term "desulfurize" as used herein refers to a process wherein organic compounds containing sulfur atoms, react with hydrogen resulting in the loss of the sulfur atom from the organic compound and replacement with a hydrogen atom. The reaction also generates hydrogen sulfide ($H_2S$).

The term "reduced organic compounds" as used herein means the reduction of organic compounds to methane or other small aliphatic hydrocarbons, such as, but not limited to, ethane, ethylene, or propane.

The term "neutralizing" as used herein means the adjustment of the pH of a solution to approximately neutral (pH 7) or to a pH that is not harmful to the environment or organisms. For example, neutralization of an acidic solution to a pH of about 7 can be done by adding a base to the acidic solution.

The term "superheated steam" as used herein refers to water that has been heated to a temperature of about 600° C. to 900° C. at a pressure greater than 0 atmosphere to about 2 atmosphere.

The term "vaporized" as used herein refers to a liquid that has been converted to its vapor form by the application of heat.

The term "base" as used herein refers to any compound which is able to accept a proton and therefore neutralize an acidic solution. Examples of bases include, but are not limited to, alkaline metal hydroxides such as sodium and potassium hydroxide and alkali metal carbonates such as calcium carbonate.

Unless otherwise indicated, the terms "a," "an," or "the" as used herein not only include aspects with one member, but also includes aspects with more than one member. For example, an embodiment including "a catalyst" should be understood to present certain aspects with one catalyst or two or more additional different catalysts.

In understanding the scope of the present disclosure, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Finally, terms of degree such as "substantially", "about" and "approximately" as used herein mean a reasonable amount of deviation of the modified term such that the end result is not significantly changed. These terms of degree should be construed as including a deviation of at least ±5% of the modified term if this deviation would not negate the meaning of the word it modifies.

(II) Processes and Apparatus of the Disclosure

The present disclosure includes a process for the conversion of organic material to a methane rich gas comprising:

a) vaporizing the organic material in an enclosed chamber substantially free of oxygen and mixing the vaporized organic material with an excess amount of hydrogen gas and, optionally, superheated steam, at a temperature of about 450° C. to about 650° C. to form a first mixture;
b) heating the first mixture to a temperature of about 600° C. to about 900° C. in the presence of an excess amount of hydrogen gas and superheated steam to form a gaseous mixture comprising methane, hydrogen and acid; and
c) neutralizing the gaseous mixture with a base.

In another embodiment of the disclosure, the first mixture is sufficiently mixed to reduce, suitably to avoid, the formation of tarry material. Thorough mixing of the vaporized organic material with the hydrogen gas and, optionally superheated steam, allows for sufficient contact of the organic compounds with the hydrogen and reduces or avoids the formation of tarry material.

In an embodiment of the disclosure, the vaporized organic material is mixed with the excess hydrogen and, optionally, superheated steam to form a first mixture at a temperature of about 475° C. to about 600° C.

At the temperature in a) of about 450° C. to about 650° C., a large portion of the aromatic and aliphatic hydrocarbons present in the organic material lose halogen atoms in a dehalogenation reaction, shown for example in Scheme 1. The reaction also generates an acid. Accordingly, when the first mixture enters b), above about 50%, optionally above about 70%, suitably above about 80%, more suitably above about 90% and most suitably above about 95% of the organic compounds in the organic material have been dehalogenated. Similarly, organic compounds containing sulfur atoms are desulfurized in the presence of an excess amount of hydrogen gas.

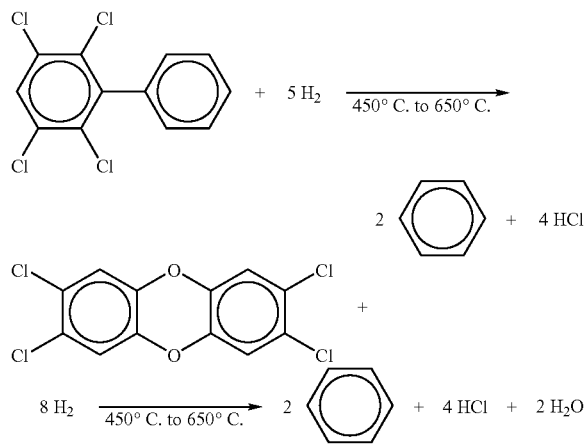

The presence of superheated steam in a) is optional. It is not required if the organic material already comprises water as the heating of such mixtures will produce steam. In embodiment, superheated steam is added during the process at some point before b).

In a further embodiment, the first mixture in b) is heated to a temperature of about 700° C. to about 900° C. In another embodiment, the first mixture in b) is heated to a temperature of about 800° C. to about 875° C.

At the temperature in b) of about 600° C. to about 900° C., a large portion of the dehalogenated and desulfurized aromatic and aliphatic hydrocarbon compounds in the first mixture will be reduced to methane or other small aliphatic hydrocarbons, as shown for example in Scheme 2. Sufficient mixing of the organic material with the excess amount of hydrogen gas and superheated steam ensures that the organic compounds are substantially reduced, and therefore, reduces or avoids the formation of tarry material.

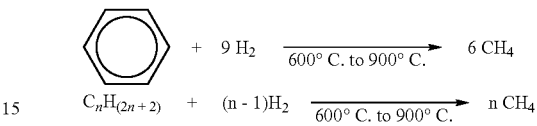

In another embodiment of the disclosure, hydrogen is generated in b) through steam methane reforming and the water-gas shift reactions. Steam in the first mixture combines with methane produced in Scheme 2 to produce hydrogen and carbon monoxide. The carbon monoxide further combines with steam to produce hydrogen and carbon dioxide. Hydrogen generated in this way reduces the overall requirement of hydrogen that must be added to form the first mixture.

In another embodiment of the disclosure, the process for the conversion of organic material to methane, the steam-methane reforming reactions and water-gas shift reactions are conducted in the presence of a catalyst. In a further embodiment, the catalyst is a metal catalyst wherein the metal is selected from one or more of nickel, copper, iron, nickel alloys, tin, powdered tin, chromium noble metals. In another embodiment, the noble metals are selected from one or more of platinum, silver, palladium, gold, ruthenium, rhodium, osmium, and iridium.

In another embodiment of the disclosure, the gaseous mixture is neutralized in c) at a temperature of about 70° C. to about 100° C. In a further embodiment, the gaseous mixture is neutralized in c) at a temperature of about 85° C. As a result of the dehalogenation and/or desulfurization reactions, the acidic by-product (HCl in Scheme 1) is neutralized before the hydrogen gas and methane is separated and purified.

In an embodiment, the base comprises any compound which neutralizes an acid. In another embodiment, the base is an alkali metal hydroxide or an alkali metal carbonate. In a further embodiment, the alkali metal hydroxide is sodium hydroxide. In another embodiment, the alkali metal carbonate is calcium carbonate.

In another embodiment of the disclosure, the process further comprises exposing the gaseous mixture from b) to UV light in the presence of an excess amount of hydrogen gas under conditions effective to reduce residual organic compounds in the gaseous mixture. In another embodiment, the conditions effective to reduce residual organic compounds in the gaseous mixture comprise heating to a temperature of about 600° C. to about 800° C. In a further embodiment, the conditions effective to reduce residual organic compounds in the gaseous mixture comprise heating to a temperature of about 650° C. to about 750° C. In another embodiment, the conditions effective to reduce residual organic compounds in the gaseous mixture comprise UV light at a wavelength of about 200 nm to about 300 nm. In another embodiment, the conditions effective to reduce residual organic compounds in the gaseous mixture comprise UV light at a wavelength of about 220 nm to about 254 nm. The gaseous mixture is exposed to UV light to reduce any residual organic compounds which were not reduced by the temperatures in b). The UV light helps to reduce any remaining aromatic or partially aromatic structures at lower temperatures than are required in b). The UV light possesses a wavelength of 254 nm, 248 nm or 220 nm which helps to reduce the residual compounds to form saturated or fully reduced aliphatic organic compounds without double bonds, preferably, methane, as shown for example in Scheme 3.

Scheme 3

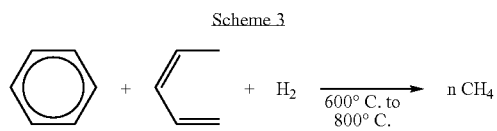

In a further embodiment of the disclosure, the heating of the first mixture in b) is carried out in a second enclosed chamber substantially free of oxygen.

In another embodiment of the disclosure, the process further comprises cooling the neutralized gaseous mixture of c). In another embodiment, the gaseous mixture is cooled to a temperature of about 5° C. to about 35° C.

In another embodiment of the disclosure, the process further comprises exposing the neutralized and cooled gaseous mixture to conditions effective to reduce residual organic compounds. In another embodiment, the conditions to reduce residual organic compounds in the neutralized and cooled gaseous mixture comprise UV light at a wavelength of about 200 nm to about 300 nm in the presence of an excess amount of hydrogen gas. In a further embodiment, the conditions to reduce residual organic compounds in the neutralized and cooled gaseous mixture comprise UV light at a wavelength of about 220 nm to about 254 nm. In another embodiment, the conditions to reduce residual organic compounds in the neutralized and cooled gaseous mixture further comprise heating to a temperature of about 300° C. to about 500° C. In an embodiment, the conditions to reduce residual organic compounds in the neutralized and cooled gaseous mixture further comprise heating to a temperature of about 400° C. At this point of the process, if there still remain unacceptable levels of aromatic compounds, such as benzene, the gaseous mixture is heated and exposed to UV again in the presence of an excess amount of hydrogen gas to reduce residual levels of unsaturated organic compounds, as shown for example in Scheme 4.

Scheme 4

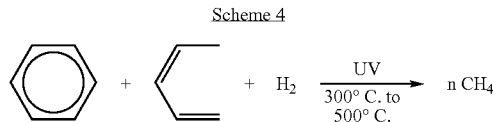

In another embodiment of the disclosure, the process further comprises separating the hydrogen gas from the methane after neutralizing the gaseous mixture in c). In an embodiment, the hydrogen gas is recycled for use in a). In an embodiment, the process of separating the hydrogen from methane is accomplished using a hydrogen separator, which are known to those skilled in the art.

In another embodiment of the disclosure, the methane gas is compressed and can be used as a clean burning fuel. In an embodiment, the methane gas possesses about 0% to about 30% hydrogen, optionally about 5% to about 25% hydrogen, suitably about 10% to about 20% hydrogen by volume.

In another embodiment of the disclosure, the organic material also comprises inorganic material which does not vaporize and is removed from the process. As a result of the inability of the inorganic material to be vaporized, the inorganic material is separated from the vaporized organic waste material. In an embodiment, the inorganic material is allowed to settle in the bottom of the enclosed chamber and subsequently removed by draining from the bottom of the chamber.

In another embodiment of the disclosure, the organic waste material comprises chlorinated or organophosphate chemical warfare agents; biological warfare agents; sewage; municipal or industrial solid waste or garbage; agricultural waste material; organic solvents; halogenated organic solvents, halogenated organic compounds such as polychlorinated biphenyls, hexachlorobenzene, chlorinated pesticides, brominated fire retardants, fluorinated propellants or fluorinated refrigerants; organophosphate compounds such as pesticides; explosives such as trinitrotoluenes; rocket fuel; hydrazines; tires; plastics such as polyethylene; refinery and chemical manufacturing/processing wastes such as still bottoms; coal; or oil and/or bitumen processing waste, for example from tar sands. In another embodiment, the chlorinated or organophosphate chemical warfare agent comprises mustard gas or VX nerve agent. In an embodiment, the biological warfare agent comprises anthrax. In a further embodiment, the agricultural waste material comprises poultry, cattle, swine or other livestock waste material such as excrement and rendering wastes. In another embodiment, the organic material comprises biomass, such as wood waste or pulp waste. In another embodiment, the biomass comprises wood chips.

In an embodiment of the disclosure, the organic material used in the method of the disclosure comprises fossil fuels such as all types of coals, oil, or peat. In this embodiment, the process represents a method for the vaporization of fossil fuels and for the conversion of these fuel sources into clean burning methane and hydrogen.

In an embodiment, the organic material is pretreated to form a uniform and easily conveyable feed. In a further embodiment, when the organic material comprises moisture, the process further comprises treating the material to remove water prior to the vaporization of the organic material in (a).

Referring to FIG. 1, an overview of the process is illustrated. In an embodiment of the disclosure, before being processed, and depending on the nature of the organic material, the material is pre-treated in a shredder/grinder apparatus 2 to form a uniform and easily conveyable feed. In an embodiment, when the organic material is soil, sediment, sewage, sludge, municipal solid waste or any other solid-type material, the shredder/grinder apparatus 2 grinds the material to a uniform size and allows for transferring the material through the process. In a further embodiment, when the organic material comprises water, it is optionally pre-treated to remove the water before being processed.

In another embodiment, the organic material is conveyed to an apparatus which is able to vaporize the organic material, for example, a continuous reduction vaporizer (CRV) 3. In an embodiment, the material is conveyed to the CRV 3 using a screw auger. In a further embodiment, when the material is flowable, it is conveyed to the CRV using a sludge pump.

In an embodiment of the disclosure, the CRV 3 is a rotatable reaction, mixing and/or milling apparatus (described in further detail below), which is heated and therefore vaporizes the organic material which has been conveyed to the CRV 3. In an embodiment of the disclosure, the organic material, in addition to organic compounds which can be vaporized, also contains inorganic waste material that does not vaporize. In an embodiment, the inorganic waste material that does not vaporize in the CRV 3, exits the CRV 3 as a treated solid 10. The treated inorganic waste material which is free of organic material, is suitable for recycling or disposal in a landfill. Examples of inorganic waste material include any type of material which will not vaporize in the heat of the CRV 3, and includes, but is not limited to metals, minerals, stones, sand or silica.

In a further embodiment, the vaporized organic material is conveyed from the CRV 3 to a mixer, such as a static mixer 4, where the vaporized organic material is thoroughly mixed with an excess amount of hydrogen gas and superheated steam. Thorough mixing of the vaporized organic material with the excess amount of hydrogen gas and superheated steam allows for the components of the mixture to be sufficiently mixed and reduce the formation of tarry material. Mixing may also be accomplished using any other known means.

In another embodiment of the disclosure, the thoroughly mixed and heated vaporized organic material, hydrogen gas and superheated steam are conveyed to an enclosed chamber substantially free of oxygen, for example, process reactor 5. In a further embodiment, the mixture is further heated in the process reactor 5 to produce methane gas.

In a further embodiment, the gaseous mixture exits the process reactor 5 and enters secondary reaction chamber 6 that employs UV light in the presence of an excess amount of hydrogen gas to reduce residual organic compounds in the gaseous mixture.

In another embodiment, the gaseous mixture then enters a quencher and primary scrubber 7 where the mixture is cooled, and acid, water and any particulate matter is removed from the mixture. In a further embodiment, the mixture enters a secondary scrubber 8 to remove residual acid and water.

In another embodiment, the gaseous mixture now predominantly comprises the hydrogen gas and methane. In another embodiment, the mixture then enters a separator 9, such as a hydrogen separator, which compresses and cools the mixture before entering a membrane type separator. The separator 9 separates the hydrogen gas from the gaseous mixture with about 85% efficiency to form two separate gas streams. Stream 11 is a methane rich gas stream that contains 10% to 20% hydrogen, which can subsequently be used, for example, as a clean burning fuel, for the generation of heat or electricity or for any other known use for methane. In a further embodiment the methane rich gas stream is further reformed to produce hydrogen and is used as a fuel, for example in fuel cells, or for any other known use of hydrogen. Stream 12 is substantially hydrogen gas recovered from the gaseous mixture that is recycled to be used again in the process, and is directed back to the CRV 3 or to the mixer 4. Water is a by-product of the reactions occurring in the process reactors, and exits the process as stream 79 from primary scrubber 7 and stream 89 from secondary scrubber 8. Streams 79 and 89 are combined and then treated and tested before exiting the process as effluent.

Figure 2:
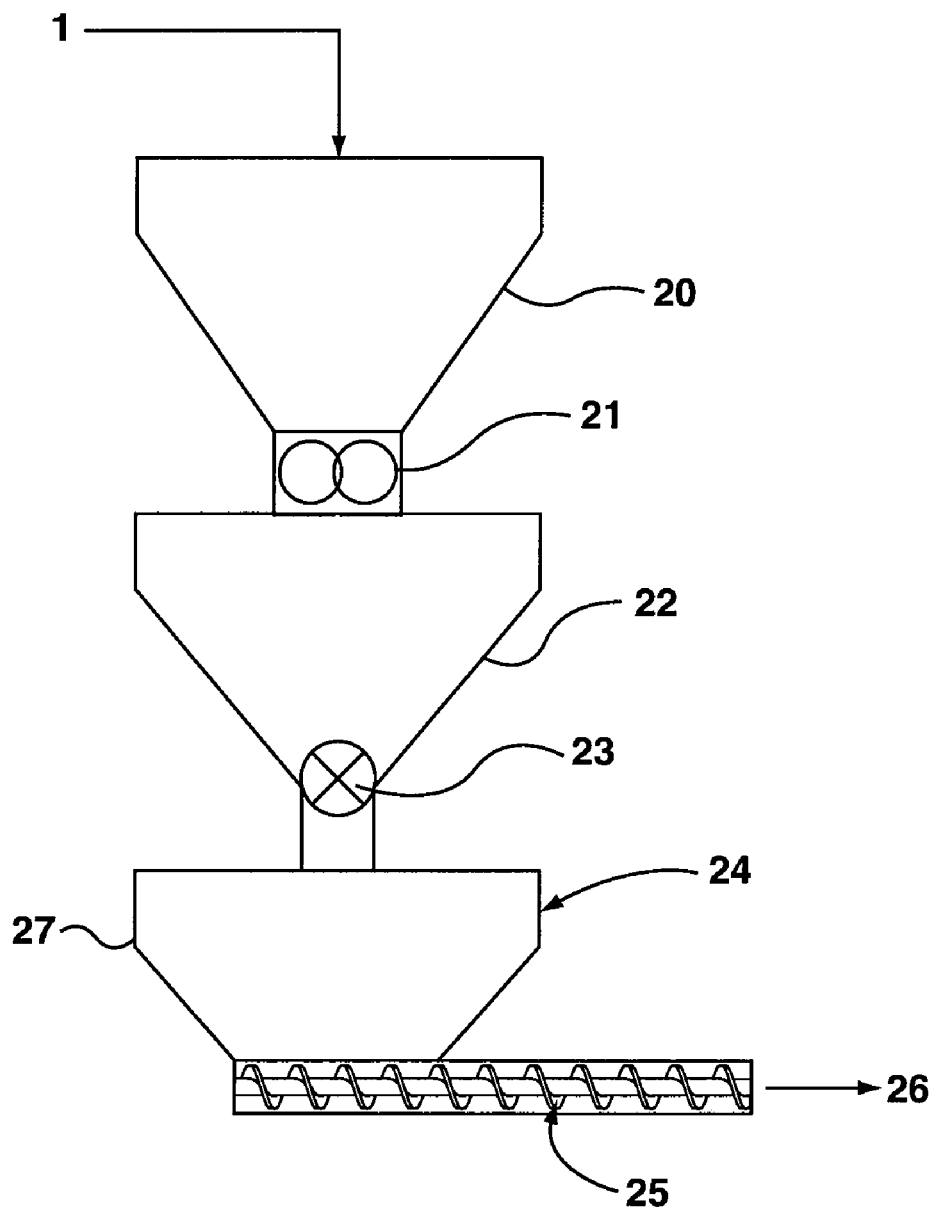
FIG. 2 is a schematic diagram an organic waste pre-treatment system in an embodiment of the present disclosure.

FIG. 2 illustrates an apparatus for the pre-treatment of the organic material according to one embodiment of the present disclosure. In this embodiment, the organic material 1 enters a primary feed hopper 20. In a further embodiment, the organic material enters a shredder/grinder apparatus 2 which grinds the material into a uniform feed which is easily conveyed through the process. Shredder/grinders are known to persons skilled in the art and are commercially available. In an embodiment, the organic material is fed through the shredder/grinder 21, which will also be known to those skilled in the art and is a commercially available item. In a further embodiment, the shredded uniform material falls into a secondary hopper 22, where it is metered into the process through a valve 23, for example a rotary valve. The organic material then enters a tertiary hopper 24, which is then conveyed by a conveyor 25, for example a screw conveyor or sludge pump, to the inlet 26 of the continuous reducing vaporizer 3.

In an embodiment, the tertiary hopper 24 is purged with an inert gas, such as nitrogen, argon, or carbon dioxide, through an inlet 27, to remove oxygen from the system. The purging allows the process to be conducted in an environment which is substantially free of oxygen.

In another embodiment, the tertiary hopper 24 is heated and purged with steam.

In another embodiment, the volume of organic material in the secondary hopper 22 is controlled by the valve 23, which meters the organic material into the tertiary hopper 24. In another embodiment, the secondary hopper 22 also provides a backpressure for the inert atmosphere in the tertiary hopper 24, which therefore provides a positive pressure seal for the process, and allows the reactions to be conducted in an atmosphere substantially free of oxygen. In a further embodiment, the conveyor 25 also provides a backpressure for the inert atmosphere between the conveyor 25 and the tertiary hopper 24.

In an embodiment of the disclosure, the conveyor 25 is a screw conveyor which comprises two counter-rotating augers to convey the organic waste material to the inlet 26 of the CRV 3. This design for the screw augers allows the augers to be completely filled and the counter-rotating action provides for a positive feed with no plugging.

In another embodiment, when the organic material is flowable, for example sewage sludge, the material is metered and conveyed to the CRV using a sludge pump. Sludge pumps are known to those skilled in the art and are commercially available.

Figure 3:
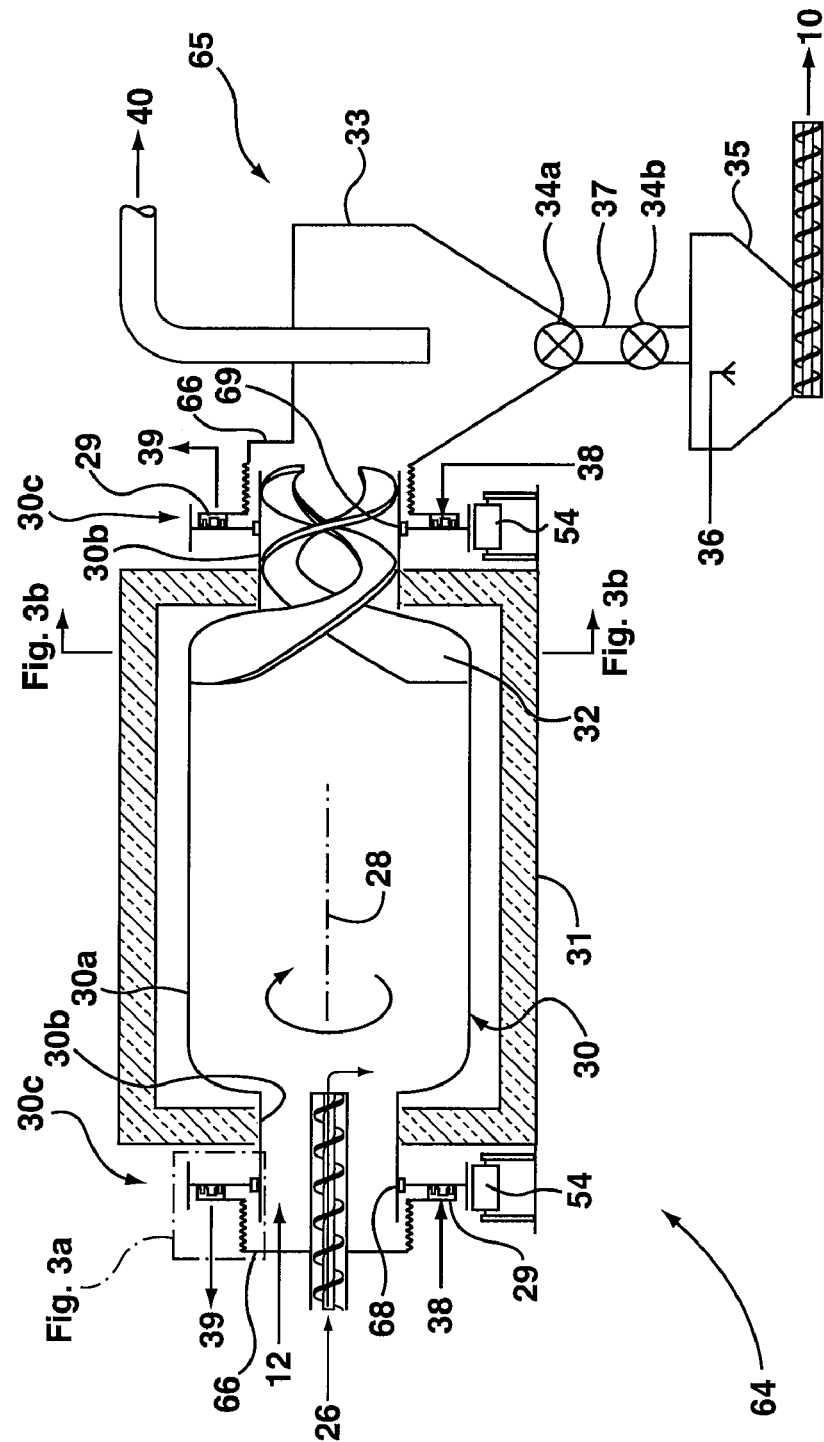
FIG. 3 is a schematic diagram of an apparatus in an embodiment of the present disclosure.

Referring to FIG. 3, an apparatus is shown generally at 64. In some embodiments, the apparatus 64 can be implemented as the CRV 3. The apparatus 64 is an example of a suitable apparatus that can be implemented as the CRV 3, and should not be construed as limiting the various embodiments provided in this disclosure. Furthermore, the apparatus 64 should not be limited to the particular implementation as the CRV 3, and can be implemented in other organic material vaporization applications. The apparatus 64 can be used more generally as, for example but not limited to, a reaction apparatus, a mixer apparatus, or as a mill apparatus (e.g., as a ball mill, rod mill, or pebble mill).

The apparatus 64 includes a vessel 30 rotatable about axis 28. The axis 28 can be generally horizontal. The vessel 30 can include a first end having an inlet 68 and a second end having an outlet 69, the inlet and outlet 68, 69 for respectively introducing or discharging materials from the vessel 30. The inlet and outlet 68, 69 can be generally coaxial with the axis 28. Helical flights 32 can be provided in the interior of the vessel 30 adjacent to the outlet 69 to assist with discharging solid materials out of the outlet 69 (see FIG. 3*b*). In some embodiments, the vessel 30 can include a main barrel section 30*a*, tapered sections 30*b* located on either side of the barrel section 30*a*, and flange sections 30*c* located on either side of the tapered sections 30*b*. Depending on the particular implementation, the vessel 30 can be formed of various materials, including, for example but not limited to, inert materials, stainless steels, and superalloys.

Figure 3A:
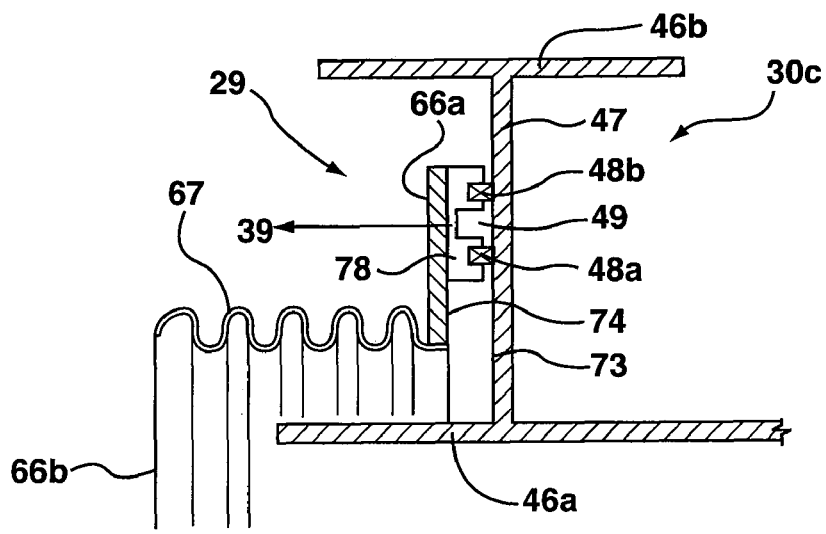
FIG. 3a is a detail view of the apparatus shown in FIG. 3.
Figure 3B:
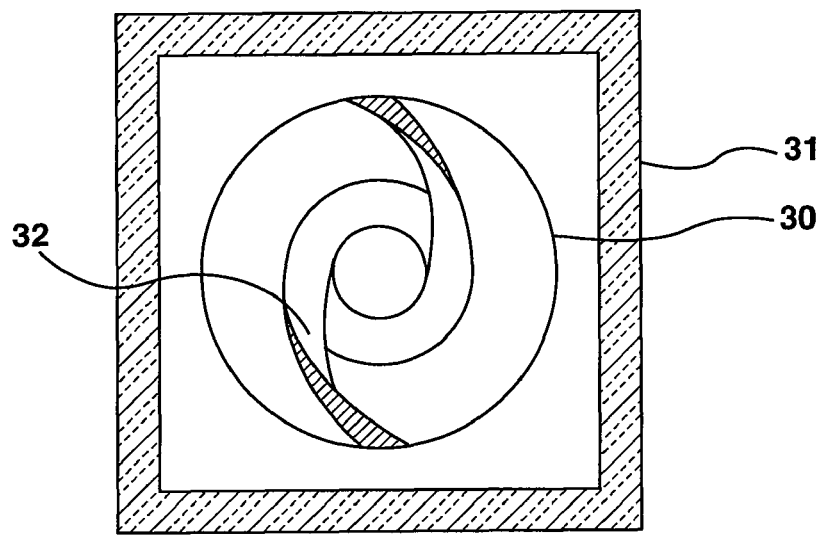
FIG. 3b is a section view of the apparatus shown in FIG. 3.

Referring now to FIG. 3*a*, the flange sections 30*c* can include inner and outer flange walls 46*a*, 46*b*. The flange walls 46*a*, 46*b* can be generally cylindrical and coaxial with the axis 28. A radial web wall 47 can connect the flange walls 46a, 46b. The web wall 47 can include a generally radially extending first face 73. The flange walls 46a, 46b and the web wall 47 can form an I-beam-type structure that is relatively rigid. The apparatus 64 can include support bearings 54 for rollably supporting the outer flange walls 46b of the flange sections 30c, the flange sections 30c thereby supporting the entire weight of the vessel 30 and its contents. The apparatus 64 can further include a drive mechanism (not shown) for rotating the vessel 30.

The apparatus 64 includes closure members 66 that can be arranged adjacent to the inlet and outlet 68, 69. The closure member 66 can include a generally radially extending second face 74 in generally opposed relation to the first face 73 of the web wall 47. The closure member 66 adjacent to the inlet 68 can include at least one inlet for introducing materials to the vessel 30. As illustrated, the closure member 66 adjacent to the inlet 68 includes the screw conveyor feed 26 and gas feed 12 for delivering materials to the vessel 30. The closure member 66 adjacent to the outlet 69 can include at least one outlet for discharging materials from the vessel 30. As illustrated, the closure member 66 adjacent to the outlet 69 is directly connected to a cyclonic chamber 33 of a separation apparatus 65.

The apparatus 64 further includes a sealing mechanism 29 at least one end of the vessel 30 to provide a seal between the rotating vessel 30 and the non-rotating closure members 66. The sealing mechanism 29 can include inner and outer sealing elements 48a, 48b arranged between the first and second faces 73, 74. The inner and outer sealing elements 48a, 48b define a generally annular space 49. The annular space 49 encloses a sealing fluid forming a seal between the vessel 30 and the closure member 66. The sealing elements 48a, 48b can be generally ring shaped and concentrically arranged. The sealing elements 48a, 48b can be fixed to either one of the first and second faces 73, 74 and are in sliding relation to the other one. As illustrated, both sealing elements 48a, 48b can be mounted to the second face 74 using the base element 78, and maintained in sliding relation to the first face 73. As illustrated, the length of the radial dimension of the first face 73 between the inner and outer flange walls 46a, 46b can permit radial displacement of the second face 74 relative to the first face 73 to tolerate thermal expansion and contraction of the vessel 30 in the radial direction. The inner and outer sealing elements 48a, 48b can be formed of a non-stick material, such as a fluoropolymer (for example, TEFLON™).

The closure members 66 can include infeed and outfeed streams 38, 39 in fluid connection with the annular space 49 for circulating sealing fluid in the annular space 49. The outfeed 39 can be located generally above the infeed 38 so that the circulation flows counter to gravity. The flow of sealing fluid can be controlled between the infeed and outfeed streams 38, 39 so as to maintain the annular space 49 substantially filled with the sealing fluid. Leakage of sealing fluid from the sealing mechanisms 29 can be tolerated if the sealing fluid is not detrimental to any reactions occurring within the vessel 30. The sealing fluid can provide for cooling of the sealing mechanisms 29 and the vessel 30. In some embodiments, the sealing fluid can include water. In some embodiments, the sealing fluid can be recycled after being returned through the outfeed 39.

The closure member 66 can further include first and second wall portions 66a, 66b separated by an expansion section 67. The first wall portion 66a includes the second face 74. The second wall portion 66b can be fixed to the screw conveyor feed 26 and gas feed 12. The expansion section 67 can permit axial displacement of the first wall portion 66a relative to the second wall portion 66b to tolerate thermal expansion and contraction of the vessel 30 in the axial direction. To prevent a gap from forming between the sealing elements 48a, 48b and the first face 73, the expansion section 67 can bias the second face 74 to bear against the first face 73 to maintain a good seal between the sealing elements 48a, 48b and the first face 73. Alternatively, an external clamp or other means of applying force can be used to bias the second face 74 to bear against the first face 73 to maintain a good seal between the sealing elements 48a, 48b and the first face 73.

The apparatus 64 can further include an insulated housing 31 that surrounds at least a portion of the vessel 30. The housing 31 can include a heat source (or a source of refrigeration, neither of which are shown), so that the temperature internal to the housing 31 is controllable. In an embodiment, the housing 31 can be heated using, for example but not limited to, indirect gas heating, indirect or direct electric heating, microwave energy, ultraviolet energy, or superheated steam. Heat can be transferred to the vessel 30 by radiation heat transfer, convection heat transfer, or conduction heat transfer, for example by a hot oil bath. As illustrated in FIG. 3, the housing 31 can generally surround the barrel section 30a and terminate at the tapered sections 30b, leaving the flange sections 30c external to the housing 31 and accessible for maintenance or other purposes.

The apparatus 64 can be connected in combination with the separation apparatus 65. The separation apparatus 65 can include the cyclonic chamber 33 in fluid connection to and tangentially aligned with the outlet 69 of the vessel 30 for receiving discharged materials. An exit conduit 40 can be positioned above the cyclonic chamber 33 for collecting gaseous materials from the cyclonic chamber 33. A hopper 35 can be positioned below and connected in fluid connection with the cyclonic chamber 33 for collecting liquid and solid materials from the cyclonic chamber 33. Valves 34a, 34b can be provided to separate the cyclonic chamber 33 and the hopper 35. Between the valves 34a, 34b, a steam purge stream 37 can be provided. A fluid source 36 can be provided in the hopper 35 for cooling the liquid and solid materials.

In some embodiments with the apparatus 64 implemented as the CRV 3, the organic material is fed into the CRV 3 through the inlet 26 from the conveyor 25. The rotating vessel 30 is housed inside an insulated housing 31, and the organic material is vaporized in the vessel 30.

In some embodiments with the apparatus 64 implemented as the CRV 3, the housing 31 can be heated using, for example but not limited to, indirect gas heating, indirect or direct electric heating, microwave energy, ultraviolet energy, or superheated steam. Heat can be transferred to the vessel 30 by radiation heat transfer, convection heat transfer, or conduction heat transfer, for example by a hot oil bath. In an embodiment of the disclosure, the organic material in the vessel 30 can be heated directly by allowing the introduction of controlled quantities of oxygen. The vessel 30 can ensure uniform vaporization of the organic material, and aids in the thorough mixing of the material and the hydrogen gas which enters the CRV 3 through stream 12. The temperature inside the vessel 30 can be controlled to between about 300° C. and about 650° C. depending upon the boiling or sublimation temperature of the organic material. A person skilled in the art would be able to determine the temperature necessary to vaporize the organic material and begin the dehalogenation and desulfurization reactions, which will depend on the nature of the material.

In some embodiments with the apparatus 64 implemented as the CRV 3, the vessel 30 can help to thoroughly mix the vaporized organic material with the excess amount of hydrogen gas. Thorough mixing of the vaporized organic material with the excess amount of hydrogen gas results in a homogenous mixture and helps to dehalogenate and desulfurize the organic compounds, and consequently, reduce or avoid the formation of tarry material.

In some embodiments, as the temperature in the CRV 3 is increased, halogen-containing organic compounds in the waste material begin to lose attached halogen atoms in a dehalogenation reaction as shown in Scheme 1. Similarly, organic compounds in the organic material also lose sulfur atoms in a desulfurization reaction.

In some embodiments, the CRV 3 operates on a continuous basis allowing for a steady stream of organic material to be converted into methane gas without the need to interrupt the process.

In some embodiments with the apparatus 64 implemented as the CRV 3, the organic material contains inorganic waste material which will not vaporize. The inorganic solid waste material can be removed from the vessel 30, for example using the helical flights 32. The flights 32 can lift the solid materials from the vessel 30 and convey them to the cyclonic chamber 33 of the separation apparatus 65. The inorganic solid waste material can exit the bottom of the cyclonic chamber 33 through the valves 34, which can include the steam purge stream 37. The steam purge 37 can provide the inorganic solid waste material with an initial cooling from the high temperature of the housing 31. The inorganic solid waste material falls into the processed solids hopper 35 where it can be further cooled by the water spray 36. The inorganic material can then exit the hopper 35 via a conveyor 10, such as a screw conveyor. In some embodiments, the water spray 36 on the hot inorganic material and the steam purge stream 37 results in positive pressure on the inside of the system, which therefore helps to maintains an atmosphere substantially free of oxygen.

In some embodiments with the apparatus 64 implemented as the CRV 3, the recycled hydrogen gas stream 12 is introduced into the apparatus 64, and provides a positive flow of sweep gas through the rotating vessel 30. The stream 12 can help to convey the vaporized organic waste material through the vessel 30 and out of the apparatus 64 through the cyclone exit 40 to a mixer 44, for example a static mixer.

In some embodiments with the apparatus 64 implemented as the CRV 3, the vessel 30 can be designed for a high temperature reducing environment. The vessel 30 can be exposed to high temperatures, harsh chemicals such as halogenated compounds, sulfur, phosphorous and heavy metals, and also a reducing environment as result of the hydrogen gas stream 12. Accordingly, in some embodiments of the disclosure, the materials used to construct the rotating vessel 30 consist of high temperature and corrosion resistant chromium nickel superalloys such as 253MA®, Hastelloy® X or Haynes® 188.

In some embodiments, the process of the present disclosure is performed in the presence of a catalyst. In a further embodiment, the catalyst is a metal catalyst wherein the metal is selected from one or more of nickel, copper, iron, nickel alloys, tin, powdered tin, chromium noble metals. In another embodiment, the noble metals are selected from one or more of platinum, silver, palladium, gold, ruthenium, rhodium, osmium, and iridium. In an embodiment, the mechanical components of the process, such as the rotating vessel 30, are composed of the metals which catalyze the process of the disclosure.

In another embodiment of the invention, the CRV 3 is replaced by an autoclave type vessel that would treat organic material on a batch basis. In an embodiment, one or more sequencing batch vaporizers (SBV) is loaded with organic material and the vessel is then sealed and purged of air with an inert gas such as nitrogen, argon, or carbon dioxide. In an embodiment, the vessel is heated and the vaporized organic material is conveyed by a sweep gas to a mixer 44, for example a static mixer.

Figure 10:
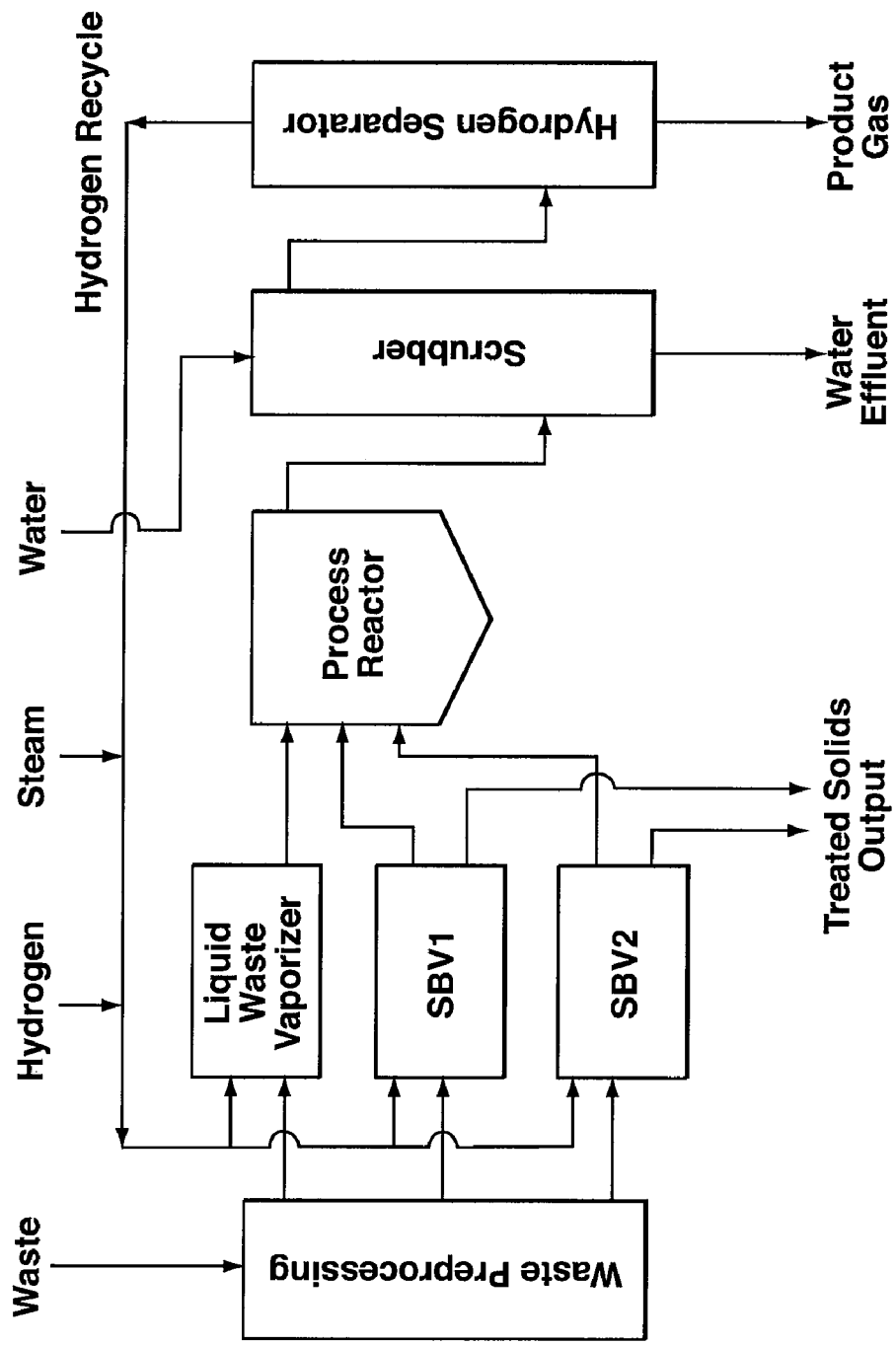
FIG. 10 is a schematic diagram of an embodiment of the process of the present disclosure.

In another embodiment of the disclosure, when the organic material is in liquid form, for example waste organic solvent or pesticides, the organic material is simply boiled to form the vaporized organic material. In an embodiment, this operation is done in a specifically designed Liquid Waste Vaporizer (LWV) that is similar to the SBV in design but in a smaller size. Atomizing nozzles spray the liquid organic material onto hot trays in the autoclave type vessel. Some of the liquid droplets vaporize directly or flash to vapor when they impact the hot trays. The LWV could be shut down periodically to clean the hot trays as inorganic materials would collect there. In another embodiment of the disclosure, one or more of any combination of CRV, SBV or LWV are used, for example as illustrated in FIG. 10.

Figure 4:
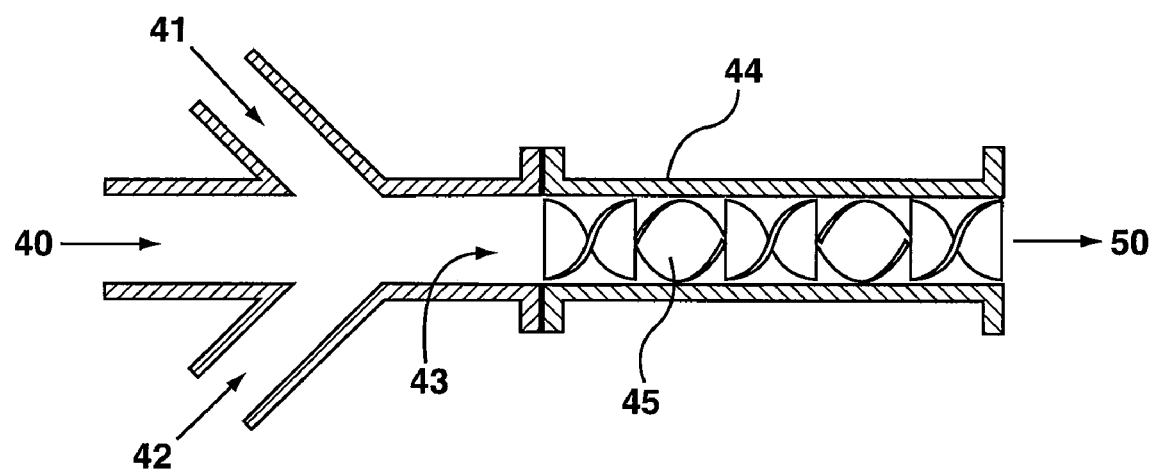
FIG. 4 is a schematic diagram of a mixer in an embodiment of the present disclosure.

As illustrated in FIG. 4, once the organic material has been vaporized in the CRV 3, the vaporized organic material is further mixed with a hydrogen gas stream 41 and a superheated steam stream 42. In an embodiment, the combined gas stream 43 then enters a mixer 44, for example a static mixer, which consists of an insulated pipe to maintain the temperature of the combined gas stream 43 and static mixer elements 45. In a further embodiment, the mixer 44 thoroughly mixes the combined gas stream 43 to prepare the combined gases for reaction in the process reactor 5. The mixer 44 is commercially available and the operation of which is well known to those skilled in the art.

In an embodiment of the disclosure, once the organic material is heated to the temperatures in the CRV 3, the organic material is continuously dehalogenated and desulfurized while it travels through the CRV 3, through the cyclonic chamber 33 and into the mixer 44. Accordingly, in an embodiment of the disclosure, before entering the process reactor 5, above, about 50%, optionally above about 70%, suitably above about 80%, more suitably above about 90% and most suitably above about 95% of the organic compounds in the organic material are dehalogenated and desulfurized.

In a further embodiment of the disclosure, the combined gas stream 43 is sufficiently mixed to allow for reaction in the process reactor 5. In another embodiment, the combined gas stream 43 exits the mixer 44 and is conveyed to the inlet 50 of the process reactor 5. In another embodiment, the temperature at the inlet 50 of the combined gas stream 43 is maintained by controlling the temperature of the hydrogen gas stream 41 and the superheated steam stream 42. Maintaining the temperature of the combined gas stream 43 and ensuring thorough mixing of said stream 43 in the mixer 44, increases the efficiency of the subsequent reactions and reduces the formation of unwanted side products, such as the formation of tarry material (condensed polyaromatic hydrocarbons), which decreases the operating efficiency of the entire process.

Figure 5:
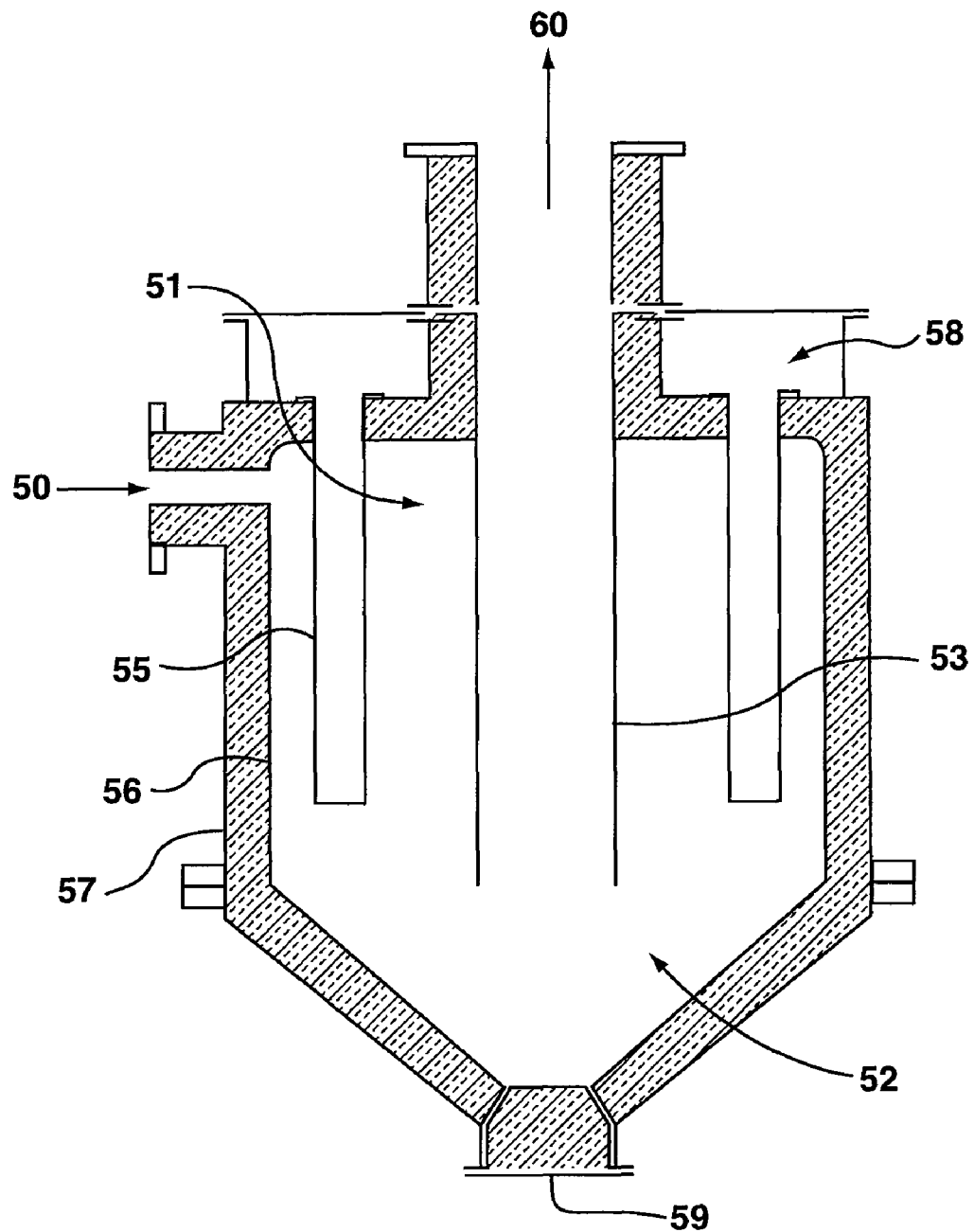
FIG. 5 is a schematic diagram of an enclosed chamber in an embodiment of the present disclosure.

FIG. 5 illustrates the enclosed chamber or process reactor 5 in one embodiment of the present disclosure. In an embodiment, the combined gas stream 43 enters the inlet 50 of the process reactor 5. In an embodiment, the process reactor 5 is designed so that the gas flow is turbulent and is also designed to act as a plug flow process reactor. A person skilled in the art would understand that turbulent flow is characterized by eddies and vortices that are present throughout the entire field of flow. A plug flow process reactor means that the flow is well mixed at any given cross section but is not mixed in the axial direction. In an embodiment, the turbulent gas flow helps to thoroughly mix the organic compounds in the organic material with the excess amount of hydrogen gas. As described, the thorough mixing of the organic compounds with the excess amount of hydrogen gas reduces the formation of tarry material.

In an embodiment of the disclosure, the dehalogenation reaction is primarily conducted in the CRV 3, the cyclonic chamber 33 and the mixer 44, while the reduction reaction of the organic compounds is primarily conducted in the process reactor 5. In another embodiment, the dehalogenation and desulfurization reactions and the reduction reaction are conducted in the same process reactor. In this embodiment, after the completion of the dehalogenation reaction, the temperature is increased to conduct the reduction reaction.

In an embodiment of the disclosure, the process reactor 5 includes a heating zone 51 and a residence time zone 52. The heating zone 51 is defined as the volume required to heat the combined gas stream 43 to a temperature effective for the dehalogenation and reduction reactions to occur with 90% efficiency, optionally 95% efficiency, optionally 99% efficiency, optionally 99.9% efficiency and suitably 99.9999% efficiency. The reaction efficiency is the percentage of any particular organic compound destroyed or chemically converted by the reduction process. Mathematically, the destruction efficiency (DE) is defined as:

$$DE = (W_{in} - W_{out}) \times 100$$

where $W_{in}$=mass feed rate of the target compound; and
$W_{out}$=mass emission rate of the target compound In an embodiment, the temperature to accomplish this efficiency for the dehalogenation and desulfurization reactions is about 450° C. to about 650° C., suitably about 475° C. to about 600° C. In another embodiment, the temperature to accomplish this efficiency for the reduction reactions is about 600° C. to about 900° C., suitably about 700° C. to about 900° C., suitably about 800° C. to about 875° C. A person skilled in the art will recognize that the exact temperature will be dependent upon the organic material being treated by the process.

In another embodiment of the disclosure, the residence time zone 52 is defined as the volume where the temperature of the gas has reached the temperature to reduce the organic compounds in the vaporized organic material (the first mixture). In an embodiment, the residence time in the residence time zone 53 is about 1 to about 10 seconds, optionally about 1 to about 5 seconds, suitably about 2 to about 4 seconds. In another embodiment of the disclosure, the gaseous mixture produced from the reduction reaction travels up the central tube 53 of the process reactor 5.

In another embodiment, the process reactor 5 is heated using one or more radiant tube type heaters 55 located in the annular heating zone 51 of the process reactor. In an embodiment, the radiant tube heaters are gas fired or electric. In another embodiment, the radiant heater(s) 55 are connected to the process reactor 5 in a zone at the top 58 of the process reactor 5 that is filled with an inert gas such as nitrogen, argon, or carbon dioxide. This design ensures that the outside air cannot leak into the process reactor 5 if a leak forms in the radiant tubes 55.

In another embodiment of the disclosure, the process reactor 5 comprises an insulated vessel consisting of an outer shell 57 made of, for example, carbon steel, with a floating liner 56 made of, for example, a nickel alloy. The floating liner 56 allows for movement due to thermal expansion as a result of the high temperatures in the process reactor 5. In a further embodiment, the process reactor 5 also possesses insulation material, such as, ceramic fiber to help maintain the high temperatures in the process reactor 5. In another embodiment, the floating liner 56 and radiant tube heater(s) 55 are constructed of materials which can withstand the high temperature reducing environment in the process reactor, in addition to withstanding chemicals such as halogenated compounds, sulphur, phosphorous, and heavy metals. In an embodiment, the floating liner 56 and radiant tube heater(s) 55 are constructed of high temperature and corrosion resistant chromium nickel superalloys such as Kanthal APM®, 253MA®, Hastelloy® X, or Haynes® 188. In another embodiment, the process reactor 5 includes a removable bottom plug 59 to allow for access into the process reactor vessel during shutdowns for inspection, maintenance, and cleaning.

In another embodiment of the disclosure, the process reactor 5 comprises a tubular process reactor design consisting of several tubes arranged in parallel and heated from the outside rather than a large vessel with internal heating elements.

Figure 6:
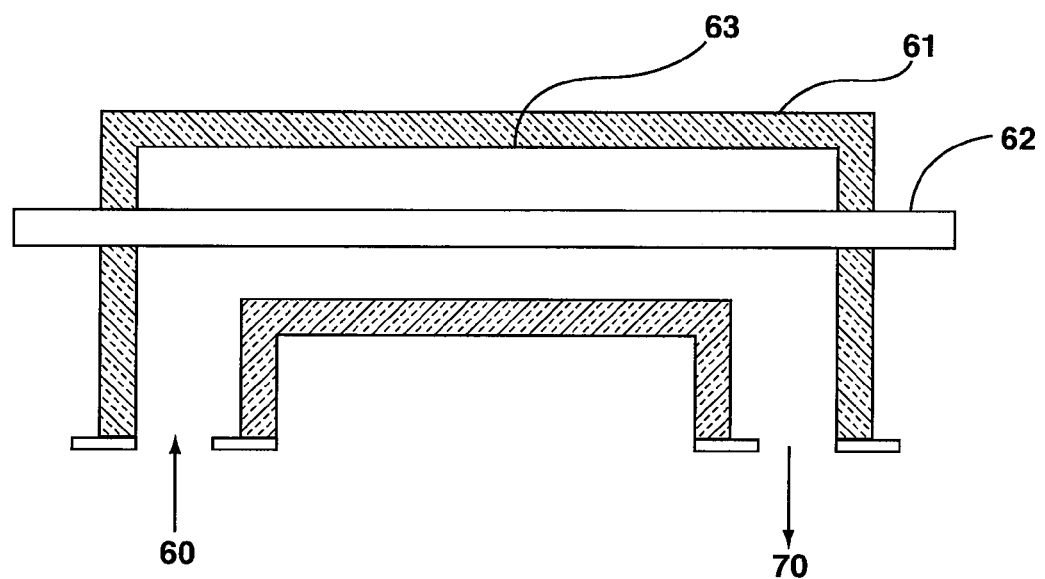
FIG. 6 is a schematic diagram of a enclosed chamber with UV in an embodiment of the present disclosure.

In an embodiment, as shown in FIG. 6, a secondary reaction chamber 61 is used to ensure the complete breakdown of double bonds and aromatic compounds that may remain in the gaseous mixture. In this embodiment, the gaseous mixture 60 enters secondary reaction chamber 61 where the gaseous mixture is exposed to ultraviolet light (UV) produced by one or more UV lamps 62 in the presence of an excess amount of hydrogen gas. The gaseous mixture then exits the secondary reaction chamber 61 as UV treated gaseous mixture 70. In another embodiment, the secondary reaction chamber 61 comprises a carbon steel shell with a floating liner 63, constructed of, for example, nickel alloy. In another embodiment, the secondary reaction chamber 61 is insulated with for example, ceramic fiber.

Figure 7:
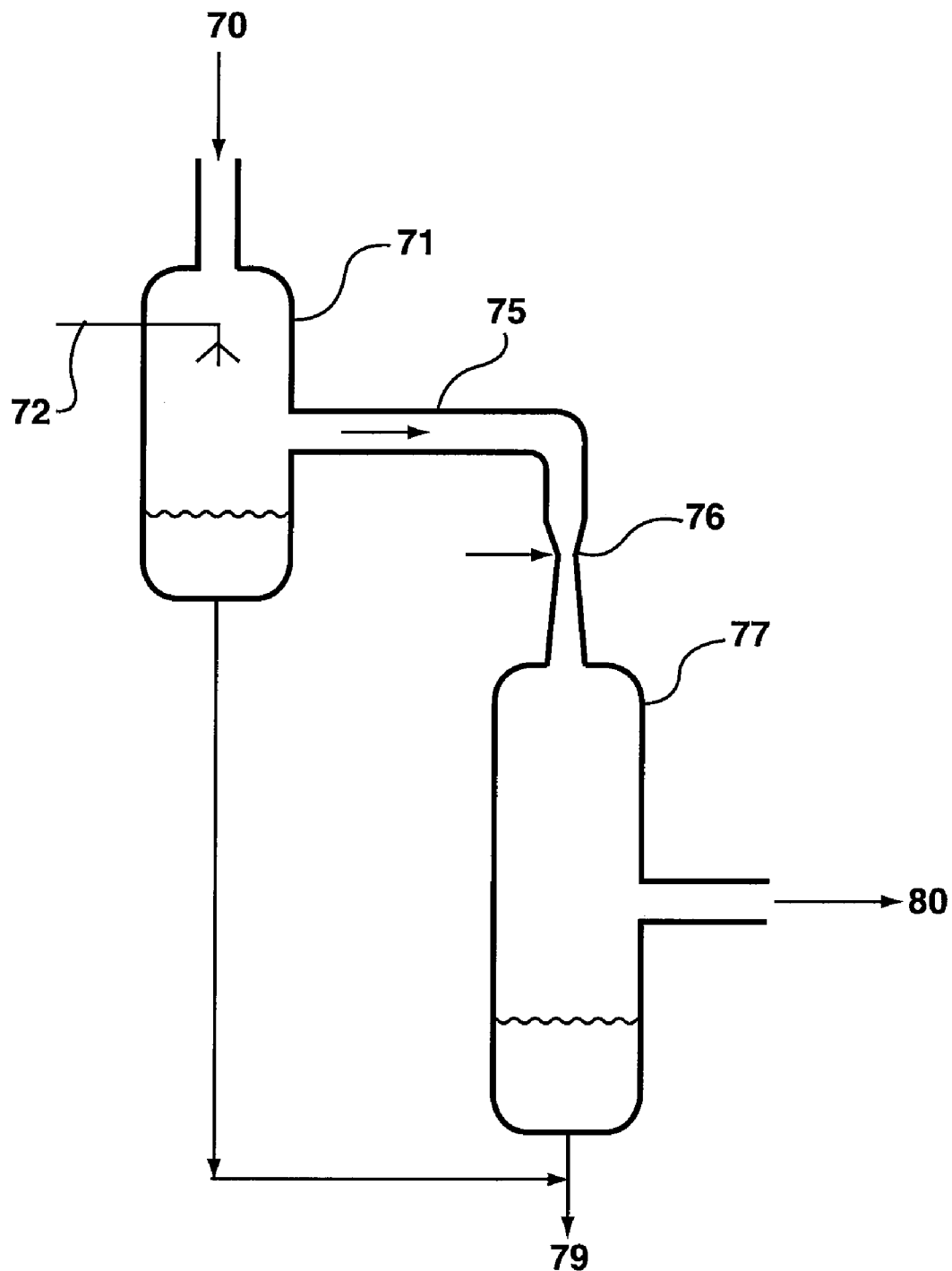
FIG. 7 is a schematic diagram of a quencher and a primary scrubber system in an embodiment of the present disclosure.

In a further embodiment and as exemplified in FIG. 7, the optionally UV treated gaseous mixture 70 enters a quencher 71 from secondary reaction chamber 61. In an embodiment, the quencher 71 includes a water spray 72 which quickly cools the gaseous mixture to a temperature of about 100° C. to about 300° C. In a further embodiment, the cooled gaseous mixture travels through a pipe 75 to a scrubber 77. In an embodiment of the disclosure, the scrubber 77 is a venturi scrubber that has a throat portion 76 where water is added. The throat section forces the gas stream to accelerate as the duct narrows and then expands. The scrubber water is atomized into small droplets by the turbulence in the throat greatly improving the contact between the gaseous mixture and the water. The quencher 71 and scrubber 77 remove heat, water, particular matter and acid gases which develop as by products from the dehalogenation and reduction reactions of halogenated compounds (particularly chlorinated, fluorinated, or brominated compounds).

In an embodiment of the disclosure, the acid gases are neutralized and removed from the gaseous mixture by addition of a base, for example, sodium hydroxide. The addition of a base results in the production of water and salts.

In another embodiment, the water added at the throat portion 76 of the scrubber 77 is collected at the bottom of the scrubber and exits as water stream 79. In a further embodiment, water from the quencher 71 also joins the water stream 79. In a further embodiment, the water stream 79 containing scrubber effluent goes to a water treatment system for filtration and testing prior to discharge. In another embodiment, the scrubber-processed gas stream 80 exits the scrubber vessel 77 and travels through a pipe to a secondary scrubber 81.

In another embodiment of the disclosure, the quencher and venturi scrubber are replaced with a dry lime type scrubber. A dry lime scrubber is used when the organic material being processed is highly halogenated, for example, hexachlorobenzene. A dry lime scrubber for this type organic material greatly reduces the water effluent from the process.

Figure 8:
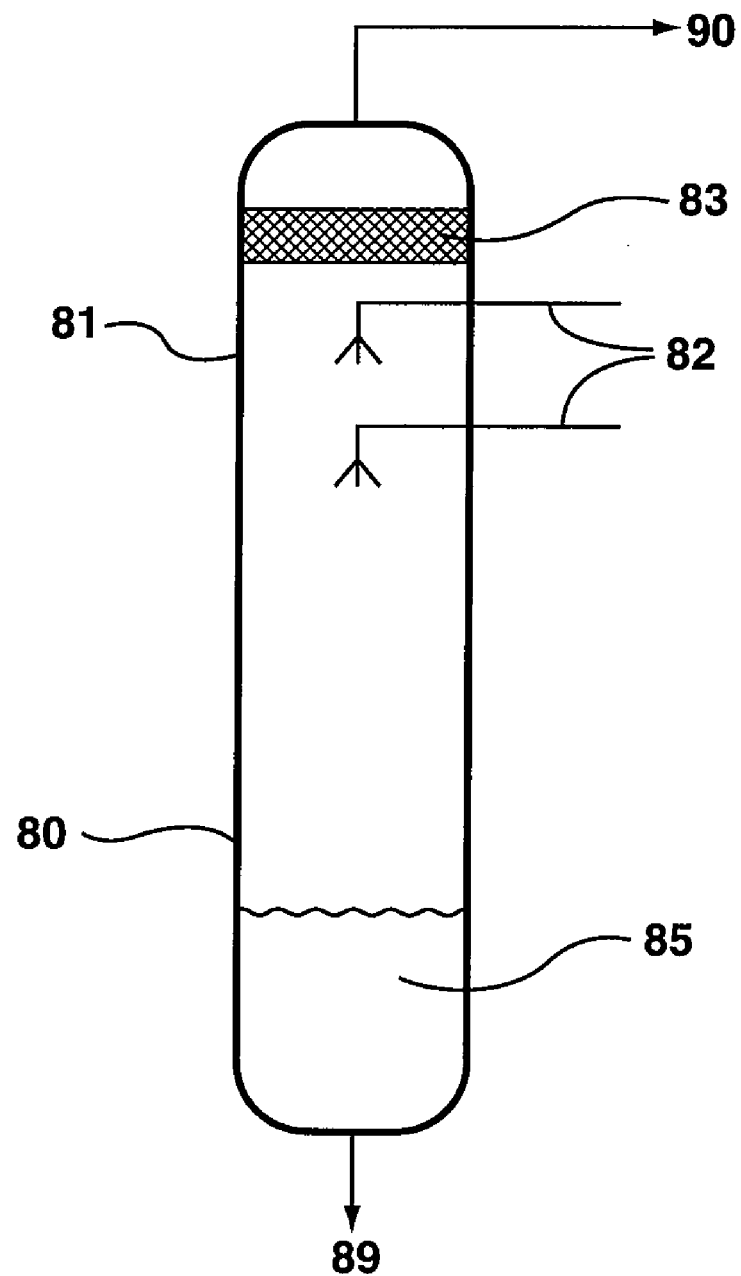
FIG. 8 is a schematic diagram of a secondary scrubber in an embodiment of the present disclosure.

In another embodiment of the disclosure, as illustrated in FIG. 8, the scrubber processed gas stream 80 enters a secondary scrubber 81, where the processed gas 80 is scrubbed again to further reduce the temperature of the processed gas 80 and remove as much water as possible from the processed gas 80. In another embodiment, the processed gas 80 is cooled by a chilled water spray 82 to a temperature of about 5° C. to about 35° C. In another embodiment, secondary scrubber 81 includes a demister element 83 which eliminates the possibility of carry over of water droplets in the secondary scrubber processed gas stream 90. In a further embodiment, the secondary scrubber processed gas stream 90 exits through a pipe near the top of the secondary scrubber 81. In this embodiment, water 85 collected in the secondary scrubber 81 discharges as a water stream 89 through a pipe located at the bottom of the secondary scrubber 81 and the water stream 89 containing scrubber effluent goes to a water treatment system for filtration and testing prior to discharge.

In another embodiment of the disclosure, the secondary scrubber 81 is further used to remove undesirable compounds, for example, phosphorous containing compounds such as phosphine gas. In this embodiment, a permanganate solution is used in the secondary scrubber 81 to remove the phosphine gas.

Figure 9:
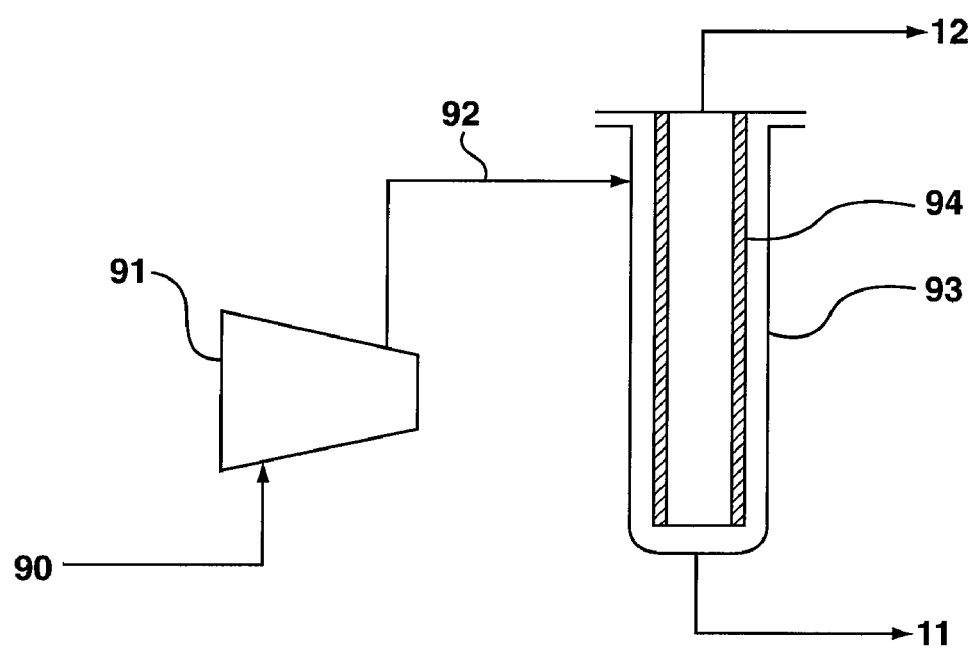
FIG. 9 is a schematic diagram of a hydrogen gas separator and recovery system in an embodiment of the present disclosure.

In another embodiment of the disclosure, as exemplified in FIG. 9, the secondary scrubber processed gas stream 90 enters a separator 9, for example a hydrogen separation system. In another embodiment, stream 90 enters a compressor 91, for example a screw compressor, where the gas is compressed to a pressure greater than about 100 psig (about 690 kPa), which is the pressure required for a hydrogen separation membrane to separate hydrogen from the methane gas. In an embodiment, the pressurized processed gas travels from the compressor 91 to the hydrogen separator modules 93 via process piping 92. In an embodiment, several hydrogen separation modules 93 are used in parallel. In a further embodiment, each hydrogen separation module consists of a membrane element 94, which filters hydrogen gas. In an embodiment of the disclosure, the membrane element 94 is a PRISM® membrane system supplied by Air Products for example. Membrane systems for hydrogen separation are known to those skilled in the art and are commercially available. In an embodiment, stream 90 enters the hydrogen separation module 93 which consists of a tube containing a cylindrical membrane element 94. In this embodiment, the hydrogen gas under pressure will permeate through the membrane with a recovery rate of about 85%, while the membrane rejects methane with an efficiency of about 90% (the carbon monoxide rejection rate is about 85%). In an embodiment, the hydrogen rich permeate exits the hydrogen separation module as stream 12 and is recycled within the process as described above (calculations show that the overall requirement for hydrogen in the gas phase reduction process is reduced by 67% by using this technology to recycle the hydrogen) and the non-permeate gas that is methane rich and hydrogen reduced exits the hydrogen separation module as stream 11. In a further embodiment, methane rich gas 11 goes to a gas storage area for testing before being available for use as a clean burning fuel or for other uses. In an embodiment, the methane comprises about 10% to about 20% by volume of hydrogen.

In another embodiment of the disclosure, the methane rich gas undergoes a further methanation reaction that converts available carbon monoxide and hydrogen in the gas to methane and water. This does not increase the overall fuel value of the gas but the higher methane to hydrogen and carbon monoxide ratio may be desirable for certain applications such as vehicle use.

In another embodiment of the invention, carbon dioxide is removed from the methane rich stream 11 and is sequestered. This increases the heating value of the gas produced and minimizes the greenhouse gas emissions from the process.

It is an embodiment of the present disclosure that the gases produced in the process are used as clean burning fuels. For example, the methane rich fuel gas can be used as a fuel sources in any known energy-generating system, for example, but not limited to gas-fired turbines, steam-fired turbines and other engines. The operation and construction of such energy-generating systems is well known in the art. The methane can also be converted to hydrogen using known carbon dioxide reforming and water gas shift processes and the hydrogen subsequently used as a fuel in known hydrogen power generation systems, for example, fuel cells. The operation and construction of hydrogen-based fuel cells is well known in the art and includes, fuels cells for automobiles or other larger power-generating systems, such as those developed by Fuel Cell Energy of Danbury Conn. The methane and/or hydrogen are either collected and transported to the energy generating system or can be fed directly into such systems, that in one embodiment of the disclosure, are in close proximity to or in combination with the process apparatus.

Three embodiments of the present disclosure are described below to provide examples of the methane rich fuel gas produced from the conversion of three specific organic materials. This information was generated using a computer model that takes the chemical composition of the organic material as an input and calculates the composition of the fuel gas using standard engineering principles known to those skilled in the art. The calculations assume that methane is added as a reactant to produce hydrogen through steam methane reforming and water-gas shift reactions. The calculations assume the following efficiencies for the hydrogen separation and recovery system: 85% hydrogen recovery, 92% methane rejection, 100% CO rejection, 50% $CO_2$ rejection, and 100% water rejection.

In an embodiment, digested sewage sludge is converted. The sewage sludge has the following dry basis chemical composition (in mol %): 4.7% nitrogen, 34% carbon, 20% oxygen, 4.9% hydrogen, 1.3% sulfur, 0.1% chlorine, and 35% ash. The process is run so that the excess amount of hydrogen remaining after completion of the reduction reactions is 40 mol %. The fuel gas produced contains the following chemical composition (in mol %): 19% hydrogen, 40% methane, 29% CO, and 12% $CO_2$. The conversion of 1 dry tonne of sewage sludge produces a methane rich clean burning fuel gas with a higher heating value of 18,500 MJ.

In an embodiment, municipal solid waste is converted. The municipal solid waste has the following dry basis chemical composition (in mol %): 3.5% nitrogen, 39% carbon, 26% oxygen, 6.4% hydrogen, 0.3% sulfur, 1.2% chlorine, 0.2% phosphorous, and 23.4% ash. The process is run so that the excess amount of hydrogen remaining after completion of the reduction reactions is 35 mol %. The fuel gas produced contains the following chemical composition (in mol %): 16% hydrogen, 40% methane, 31% CO, and 13% $CO_2$. The conversion of 1 dry tonne of municipal solid waste produces a methane rich clean burning fuel gas with a higher heating value of 19,400 MJ.

In an embodiment, brown coal is converted. The brown coal has the following dry basis chemical composition (in mol %): 2.0% nitrogen, 77% carbon, 10.6% oxygen, 5.5% hydrogen, 4.5% sulfur, 0.1% chlorine, and 0.3% ash. The process is run so that the excess amount of hydrogen remaining after completion of the reduction reactions is 30 mol %. The fuel gas produced contains the following chemical composition (in mol %): 12% hydrogen, 42% methane, 32% CO, and 14% $CO_2$. The conversion of 1 dry tonne of brown coal produces a methane rich clean burning fuel gas with a higher heating value of 39,600 MJ.

While the present disclosure has been described with reference to what are presently considered to be the preferred examples, it is to be understood that the disclosure is not limited to the disclosed examples. To the contrary, the disclosure is intended to cover various modifications and equivalent arrangements included within the spirit and scope of the appended claims.

All publications, patents and patent applications are herein incorporated by reference in their entirety to the same extent as if each individual publication, patent or patent application was specifically and individually indicated to be incorporated by reference in its entirety. Where a term in the present application is found to be defined differently in a document incorporated herein by reference, the definition provided herein is to serve as the definition for the term.

We claim:

1. A process for the conversion of organic material to a methane rich gas comprising:
   a) vaporizing the organic material in an enclosed chamber substantially free of oxygen, and mixing the vaporized organic material with an excess amount of hydrogen gas at a temperature of about 450° C. to about 650° C., and, optionally, superheated steam, to form a first mixture;
   b) heating the first mixture to a temperature of about 600° C. to about 900° C. in the presence of an excess amount of hydrogen gas and superheated steam to form a gaseous mixture comprising methane, hydrogen and acid; and
   c) neutralizing the gaseous mixture with a base.

2. The process according to claim 1, wherein the first mixture is sufficiently mixed to reduce the formation of tarry material.

3. The process according to claim 1, wherein the vaporized organic material is mixed with the excess hydrogen gas and superheated steam at a temperature of about 475° C. to about 600° C.

4. The process according to claim 1, wherein the first mixture is heated in b) to a temperature of about 700° C. to about 900° C.

5. The process according to claim 1, wherein the process is conducted in the presence of a catalyst.

6. The process according to claim 1, wherein the gaseous mixture is neutralized in c) at a temperature of about 70° C. to about 100° C.

7. The process according to claim 1, wherein the base comprises an alkali metal hydroxide or an alkali metal carbonate.

8. The process according to claim 1, further comprising exposing the gaseous mixture from b) to UV light in the presence of an excess amount of hydrogen gas under conditions effective to reduce residual organic compounds in the gaseous mixture.

9. The process according to claim 1, wherein the heating of the first mixture in b) is carried out in a second enclosed chamber substantially free of oxygen.

10. The process according to claim 1, further comprising cooling the neutralized gaseous mixture of c).

11. The process according to claim 10, further comprising exposing the neutralized and cooled gaseous mixture in the presence of an excess amount of hydrogen gas to conditions effective to reduce residual organic compounds.

12. The process according to claim 1, performed at a pressure greater than 0 atmospheres and less than 2 atmospheres.

13. The process according to claim 1, further comprising separating the hydrogen gas and the methane after neutralizing the gaseous mixture in c).

14. The process according to claim 13, wherein the hydrogen gas is recycled for use in a) and/or b).

15. The process according to claim 13, wherein the methane comprises about 10% to about 20% by volume of hydrogen.

16. The process according to claim 15, further comprising transferring the methane to an energy-making system.

17. The process according to claim 16, wherein the energy-making system is a gas-fired turbine or an engine.

18. The process according to claim 16, wherein the energy-making system is a fuel cell.

19. The process according to claim 1, wherein the organic material comprises chlorinated or organophosphate chemical warfare agents, biological warfare agents, sewage, municipal or industrial solid waste or garbage, agricultural waste, organic solvents, halogenated organic solvents, halogenated organic compounds, organophosphate compounds, explosives, rocket fuel, hydrazines, tires, plastics, coal, oil, peat, biomass, refinery or chemical manufacturing/processing wastes such as still bottoms, or oil and/or bitumen processing waste.

20. The process according to claim 19, wherein the chlorinated or organophosphate chemical warfare agent comprises mustard gas or VX nerve agent.

21. The process according to claim 19, wherein the biological warfare agent comprises anthrax.

22. The process according to claim 19, wherein the agricultural waste material comprises poultry, cattle, swine or other livestock waste material.

23. The process according to claim 19, wherein the halogenated organic compound is polychlorinated biphenyl, hexachlorobenzene, chlorinated pesticides, brominated fire retardants, fluorinated propellants or fluorinated refrigerants.

24. The process according to claim 19, wherein the organophosphate compound is a pesticide.

25. The process according to claim 19, wherein the oil and/or bitumen processing waste is oil and/or bitumen processing waste from tar sands.

26. The process according to claim 19, wherein the organic material is a fossil fuel.

27. The process according to claim 26 wherein the fossil fuel is coal, oil or peat.

28. The process according to claim 19, wherein the biomass is wood waste, pulpwaste or wood chips.

29. The process according to claim 4, wherein the first mixture is heated in b) to a temperature of about 800° C. to about 875° C.

30. The process according to claim 5, wherein the catalyst is a metal catalyst wherein the metal is selected from one or more of nickel, copper, iron, nickel alloys, tin, powdered tin, chromium and noble metals.

31. The process according to claim 30, wherein the noble metals are selected from one or more of platinum, silver, palladium, gold, ruthenium, rhodium, osmium and iridium.

32. The process according to claim 6, wherein the gaseous mixture is neutralized in c) at a temperature of about 85° C.

33. The process according to claim 7, wherein the alkali metal hydroxide is sodium hydroxide.

34. The process according to claim 7, wherein the alkali metal carbonate is calcium carbonate.

35. The process according to claim 8, wherein the conditions effective to reduce residual organic compounds in the gaseous mixture comprise heating to a temperature of about 600° C. to about 800° C.

36. The process according to claim 35, wherein the conditions effective to reduce residual organic compounds in the gaseous mixture comprise heating to a temperature of about 650° C. to about 750° C.

37. The process according to claim 14, wherein the conditions effective to reduce residual organic compounds in the gaseous mixture comprise UV light at a wavelength of about 200 nm to about 300 nm.

38. The process according to claim 37, wherein the conditions effective to reduce residual organic compounds in the gaseous mixture comprise UV light at a wavelength of about 220 nm to about 254 nm.

39. The process according to claim 10, wherein the gaseous mixture is cooled to a temperature of about 5° C. to about 35° C.

40. The process according to claim 11, wherein the conditions to reduce residual organic compounds in the neutralized and cooled gaseous mixture comprise UV light at a wavelength of about 200 nm to about 300 nm.

41. The process according to claim 40, wherein the conditions to reduce residual organic compounds in the neutralized and cooled gaseous mixture comprise UV light at a wavelength of about 220 nm to about 254 nm.

42. The process according to claim 11, wherein the conditions to reduce residual organic compounds in the neutralized and cooled gaseous mixture further comprise heating to a temperature of about 300° C. to about 500° C.

43. The process according to claim 1, wherein the organic material also comprises inorganic material which does not vaporize and is removed from the enclosed chamber.

44. The process according to claim 22, wherein the livestock waste material is excrement or rendering wastes.

* * * * *